(12) United States Patent
Clement et al.

(10) Patent No.: US 11,346,049 B2
(45) Date of Patent: May 31, 2022

(54) TWO-LAYER MULTI-STRAND CORDS HAVING VERY LOW, LOW AND MEDIUM MODULI

(71) Applicant: COMPAGNIE GENERALE DES ETABLISSEMENTS MICHELIN, Clermont-Ferrand (FR)

(72) Inventors: Emmanuel Clement, Clermont-Ferrand (FR); Romain Barbat, Clermont-Ferrand (FR); Marianna Chevalley, Clermont-Ferrand (FR); Alexandre Gianetti, Clermont-Ferrand (FR); Stephane Laurent, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 103 days.

(21) Appl. No.: 16/956,170

(22) PCT Filed: Dec. 19, 2018

(86) PCT No.: PCT/FR2018/053420
§ 371 (c)(1),
(2) Date: Jun. 19, 2020

(87) PCT Pub. No.: WO2019/122724
PCT Pub. Date: Jun. 27, 2019

(65) Prior Publication Data
US 2021/0079592 A1 Mar. 18, 2021

(30) Foreign Application Priority Data
Dec. 19, 2017 (FR) .................................. 1762504

(51) Int. Cl.
*D07B 1/06* (2006.01)
*B60C 9/00* (2006.01)
*B60C 9/20* (2006.01)

(52) U.S. Cl.
CPC .......... *D07B 1/0613* (2013.01); *B60C 9/0007* (2013.01); *D07B 1/0626* (2013.01);
(Continued)

(58) Field of Classification Search
CPC .. D07B 1/0613; D07B 1/0626; D07B 1/0633; D07B 2009/2077; D07B 2201/1044;
(Continued)

(56) References Cited

U.S. PATENT DOCUMENTS 4,265,291 A 5/1981 Pommier
4,274,464 A 6/1981 Pommier
(Continued)

FOREIGN PATENT DOCUMENTS

DE 6 937 562 U 1/1970
EP 2 065 511 A1 6/2009
(Continued)

OTHER PUBLICATIONS

International Search Report dated Apr. 17, 2019, in corresponding PCT/FR2018/053420 (5 pages).

*Primary Examiner* — Shaun R Hurley
(74) *Attorney, Agent, or Firm* — Venable LLP

(57) ABSTRACT

A two-layer multi-strand cord (60) comprises an internal layer (CI) of the cord made up of J>1 internal strands (TI) and an external layer (CE) of the cord made up of L>1 external strands (TE). The cord satisfies the relationship 95≤MC≤175, where MC=(J×MI+L×ME)/(J+L); MI=200× $\cos^4(\alpha) \times [Q \times (D1/2)^2 \times \cos^4(\beta) + P \times (D2/2)^2 \times \cos^4(\delta) + N \times (D3/2)^2 \times \cos^4(\gamma)]/[Q \times (D1/2)^2 + P \times (D2/2)^2 + N \times (D3/2)^2]$; and ME=200×$\cos^4(\alpha') \times [Q' \times (D1'/2)^2 \times \cos^4(\beta') + N' \times (D2'/2)^2 \times$ (Continued)

$\cos^4(\gamma')]/[Q'\times(D1'/2)^2+N'\times(D2'/2)^2]$, where D1, D1', D2, D2', and D3 are in mm, $\alpha$ and $\alpha'$ are the helix angle of each internal and external strand (TI), $\beta$ and $\beta'$ are the helix angle of each internal thread (F1, F1'), $\delta$ is the helix angle of each intermediate thread (F2) and $\gamma$ and $\gamma'$ are the helix angle of each external thread (F3, F2').

15 Claims, 2 Drawing Sheets

(52) U.S. Cl.
CPC .... *D07B 1/0633* (2013.01); *B60C 2009/2077* (2013.01); *B60C 2200/065* (2013.01); *D07B 2201/1044* (2013.01); *D07B 2201/1048* (2013.01); *D07B 2201/2025* (2013.01); *D07B 2201/2061* (2013.01); *D07B 2401/2005* (2013.01); *D07B 2501/2046* (2013.01)

(58) Field of Classification Search
CPC .... D07B 2201/1048; D07B 2201/2025; D07B 2201/2061; D07B 2401/2005; D07B 2501/2046; B60C 9/0007
See application file for complete search history.

(56) References Cited

U.S. PATENT DOCUMENTS

| | | | |
|---|---|---|---|
| 5,461,850 A | 10/1995 | Bruyneel et al. | |
| 5,843,583 A | 12/1998 | D'Haene et al. | |
| 8,006,475 B2 | 8/2011 | Aoyama | |
| 8,166,741 B2 | 5/2012 | Barguet et al. | |
| 8,863,490 B2 | 10/2014 | Boisseau et al. | |
| 2009/0205308 A1 | 8/2009 | Aoyama | |
| 2009/0294009 A1 | 12/2009 | Barguet et al. | |
| 2012/0174557 A1 | 7/2012 | Boisseau et al. | |
| 2012/0227885 A1 | 9/2012 | Cheng et al. | |
| 2015/0136295 A1 | 5/2015 | Barguet et al. | |
| 2015/0159325 A1 | 6/2015 | Barguet et al. | |
| 2015/0251497 A1 | 9/2015 | Ferlin | |
| 2017/0210169 A1* | 7/2017 | Nozaki | D07B 1/0613 |
| 2019/0225018 A1* | 7/2019 | Nozaki | D07B 1/0613 |
| 2019/0234016 A1* | 8/2019 | Nozaki | B60C 9/2006 |
| 2021/0071359 A1 | 3/2021 | Clement et al. | |
| 2021/0102336 A1 | 4/2021 | Clement et al. | |
| 2021/0188004 A1 | 6/2021 | Clement et al. | |
| 2021/0206204 A1 | 7/2021 | Clement et al. | |

FOREIGN PATENT DOCUMENTS

| | | |
|---|---|---|
| FR | 2419181 A1 | 10/1979 |
| FR | 2419182 A1 | 10/1979 |
| FR | 2 947 574 A1 | 1/2011 |
| JP | 11-61663 A | 3/1999 |
| JP | 2002-30587 A | 1/2002 |
| JP | 2005-248373 A | 9/2005 |
| JP | 2006-291376 A | 10/2006 |
| JP | 2006-291419 A | 10/2006 |
| JP | 2007-107136 A | 4/2007 |
| WO | 2005/014925 A1 | 2/2005 |
| WO | 2007/090603 A1 | 8/2007 |
| WO | 2008/026271 A1 | 3/2008 |
| WO | 2013/174897 A1 | 11/2013 |
| WO | 2014/048897 A1 | 4/2014 |
| WO | 2015/090920 A1 | 6/2015 |

* cited by examiner

TWO-LAYER MULTI-STRAND CORDS HAVING VERY LOW, LOW AND MEDIUM MODULI

BACKGROUND

The invention relates to multi-strand cords that can be used notably for reinforcing tyres, particularly tyres for heavy industrial vehicles, and to tyres using such cords.

A tyre having a radial carcass reinforcement comprises a tread, two inextensible beads, two sidewalls connecting the beads to the tread and a belt, or crown reinforcement, arranged circumferentially between the carcass reinforcement and the tread. This crown reinforcement comprises several reinforcements having different functions.

The crown reinforcement generally comprises a working reinforcement comprising two working plies, or crossed plies, comprising filamentary metal working reinforcing elements arranged substantially parallel to one another within each working ply, but crossed from one ply to the other, that is to say inclined, symmetrically or asymmetrically, with respect to the median circumferential plane, by an angle generally ranging between 15° and 40°. This working reinforcement makes it possible, included amongst other functions, for the transverse loadings applied by the ground to be transmitted at least partially to the tyre when the latter is running, so as to provide the tyre with steering capability, namely to give the tyre the ability to allow the vehicle to which it is fitted to corner.

Such filamentary metal working elements are notably described in WO2008026271. WO2008026271 describes two-layer multi-strand cords comprising an internal layer of the cord made up of J>1 internal strands wound in a helix and an external layer of the cord made up of L>1 external strands wound around the internal layer of the cord. Each internal and external strand has multiple layers and comprises at least an internal layer made up of Q>1 internal threads, possibly an intermediate layer made up of P>1 intermediate threads wound around the internal layer, and an external layer made up of N>1 external threads wound around the internal or intermediate layer.

In WO2008026271, the objective is to provide filamentary working reinforcing elements that have a stiffness and a breaking strength that are as high as possible so as to avoid the damage caused to the crown reinforcement, and notably to the working reinforcement, by the obstacles encountered by the tyre when it is running.

In WO2008026271, this objective is achieved by increasing the number of internal strands and external strands as far as possible with respect to conventional multi-strand cords in which the breaking strength is lower and for which J=1 and L=6, such as notably described in WO2015090920. Thus, in WO2008026271, the objective is to combat the deformation imposed by the obstacles encountered by countering them with cords that are as stiff and mechanically strong as possible.

However, while this solution is effective against obstacles of relatively small or medium size, it proves ineffective with regard to larger-sized obstacles. Specifically, in such cases, the loadings exerted on the cords are higher than the hardness of the steel and the obstacle therefore shears through the cords, and the stiffer these cords are, and the better they oppose the deformation imposed by the obstacle, the more easily they become sheared.

One object of the invention is a cord that makes it possible to avoid the damage caused by obstacles that highly stress the crown reinforcement, notably the working reinforcement of the tyre.

SUMMARY

Cord According to the Invention

To this end, one subject of the invention is a two-layer multi-strand cord comprising:
  an internal layer of the cord made up of J>1 internal strands wound in a helix, each internal strand having three layers and comprising:
    an internal layer made up of Q≥1 internal threads of diameter D1,
    an intermediate layer made up of P>1 intermediate threads of diameter D2 wound around the internal layer, and
    an external layer made up of N>1 external threads of diameter D3 wound around the intermediate layer,
  an external layer of the cord made up of L>1 external strands wound around the internal layer of the cord, each external strand having two layers and comprising:
    an internal layer made up of Q'≥1 internal threads of diameter D1',
    an external layer made up of N'>1 external threads of diameter D2' wound around the internal layer,
  the cord satisfying the following relationship:

$$95 \leq MC \leq 175$$

where $$MC = (J \times MI + L \times ME)/(J+L) \text{ where}$$

$$MI = 200 \times \cos^4(\alpha) \times [Q \times (D1/2)^2 \times \cos^4(\beta) + P \times (D2/2)^2 \times \cos^4(\delta) + N \times (D3/2)^2 \times \cos^4(\gamma)]/[Q \times (D1/2)^2 + P \times (D2/2)^2 + N \times (D3/2)^2] \text{ where:}$$

D1, D2 and D3 are expressed in mm,
α is the helix angle of each internal strand in the internal layer of the cord,
β is the helix angle of each internal thread in the internal layer within each internal strand,
δ is the helix angle of each intermediate thread in the intermediate layer within each internal strand, and
γ is the helix angle of each external thread in the external layer within each internal strand, and $$ME = 200 \times \cos^4(\alpha') \times [Q' \times (D1'/2)^2 \times \cos^4(\beta') + N' \times (D2'/2)^2 \times \cos^4(\gamma')]/[Q' \times (D1'/2)^2 + N' \times (D2'/2)^2]$$
where:

D1', D2' and D3' are expressed in mm
α' is the helix angle of each external strand in the external layer of the cord,
β' is the helix angle of each internal thread in the internal layer within each external strand, and
γ' is the helix angle of each external thread in the external layer within each external strand.

Unlike in the prior art in which the cords have modulus values much higher than 160 GPa and are therefore relatively stiff, the inventors have found that the cords according to the invention, with lower modulus values, perform better against obstacles that highly stress the crown reinforcement of the tyre.

Specifically, the inventors have found that it was more effective to hug the obstacle by using a cord with a lower modulus than to attempt to stiffen and reinforce the cords as far as possible in order to oppose the deformations imposed by the obstacles as was taught in the prior art. By hugging the obstacles, the shearing imposed on the cords and therefore the risk of breakage of these cords is reduced.

The value of the indicator MC of the cords according to the invention ensures that the latter have structures corresponding to relatively low modulus values ranging from 50 GPa and 160 GPa, thus making it possible to hug the obstacles encountered, unlike the cords of the prior art which are far too stiff.

Furthermore, the value of the indicator MC of the cords according to the invention ensures that the latter have a modulus that is high enough to provide the tyre with sufficient steering capability when used in the working reinforcement.

The helix angles are defined by the following formulae:

$$\alpha = \arctan\left(\frac{2\pi RI}{PI}\right)$$

in which RI is the radius of winding of the internal strands and PI is the pitch at which each internal strand is wound.

$$\beta = \arctan\left(\frac{2\pi R1}{p1}\right)$$

in which R1 is the radius of winding of the Q internal threads of each internal strand and p1 is the pitch at which the Q internal threads are assembled within each internal strand. When Q=1, R1=0 and therefore β=0.

$$\delta = \arctan\left(\frac{2\pi R2}{p2}\right)$$

in which R2 is the radius of winding of the P intermediate threads of each internal strand and p2 is the pitch at which the P intermediate threads are assembled within each internal strand.

$$\gamma = \arctan\left(\frac{2\pi R3}{p3}\right)$$

in which R3 is the radius of winding of the N external threads of each internal strand and p3 is the pitch at which the N external threads are assembled within each internal strand.

$$\alpha' = \arctan\left(\frac{2\pi RE}{PE}\right)$$

in which RE is the radius of winding of the external strands and PE is the pitch at which each external strand is wound.

$$\beta' = \arctan\left(\frac{2\pi R1'}{p1'}\right)$$

in which R1' is the radius of winding of the Q' internal threads of each external strand and p1' is the pitch at which the Q' internal threads are assembled within each external strand. When Q'=1, R1'=0 and therefore β'=0.

$$\gamma' = \arctan\left(\frac{2\pi R2'}{p2}\right)$$

in which R2' is the radius of winding of the N' external threads of each external strand and p2' is the pitch at which the N' external threads are assembled within each external strand.

The radii of winding RI and RE are measured on a transverse cross section perpendicular to the main axis of the cord and correspond to the distance between the centre of the helix described by, respectively, each internal and external strand and the centre of the cord.

Similarly, the radii of winding R1, R2 and R3 are measured on a transverse cross section perpendicular to the main axis of each internal strand considered individually and correspond to the distance between the centre of the helix described by, respectively, each internal, intermediate and external thread, and the centre of the internal strand.

Similarly, the radii of winding R1' and R2' are measured on a transverse cross section perpendicular to the main axis of each external strand considered individually and correspond to the distance between the centre of the helix described by, respectively, each internal and external thread, and the centre of the external strand.

In the invention, the cord has two layers of strands, which means to say that it comprises an assembly made up of two layers of strands, neither more nor less, which means to say that the assembly has two layers of strands, not one, not three, but only two. The external layer of the cord is wound in a helix around the internal layer of the cord in contact with the internal layer of the cord.

Each internal strand has three layers, which means to say that it comprises an assembly made up of three layers of threads, neither more nor less, which means to say that the assembly has three layers of threads, not two, not four, but only three. The external layer of each strand is wound in a helix around the intermediate layer of this strand in contact with the intermediate layer of this strand. The intermediate layer of each strand is wound in a helix around the internal layer of this strand in contact with the internal layer of this strand.

Each external strand has two layers, which is to say that it comprises an assembly made up of two layers of threads, neither more nor less, which is to say that the assembly has two layers of threads, not one, not three, but only two. The external layer of each strand is wound in a helix around the internal layer of this strand in contact with the internal layer of this strand.

Furthermore, unlike in the case where J=1 and in which there might be a risk of seeing the internal strand exit the cord radially under the effect of the repeated compressive loadings applied to the cord, the presence of several strands in the internal layer of the cord (J>1) wound in a helix makes it possible to reduce this risk, the compressive loadings then being distributed over the plurality of strands of the internal layer of the cord and the helix keeping the internal strands together.

As an option and a preference, in one embodiment, the cord does not have any polymeric compound, notably the cord does not have any sheath of any polymeric compound covering the internal strand. In another embodiment, the cord does not have any elastomeric compound, notably the cord does not have any sheath of any elastomeric compound covering the internal strand.

BRIEF DESCRIPTION OF THE DRAWINGS

The invention will be better understood on reading the following description, given solely by way of non-limiting example and with reference to the drawings, in which.

DETAILED DESCRIPTION

Figure 1:
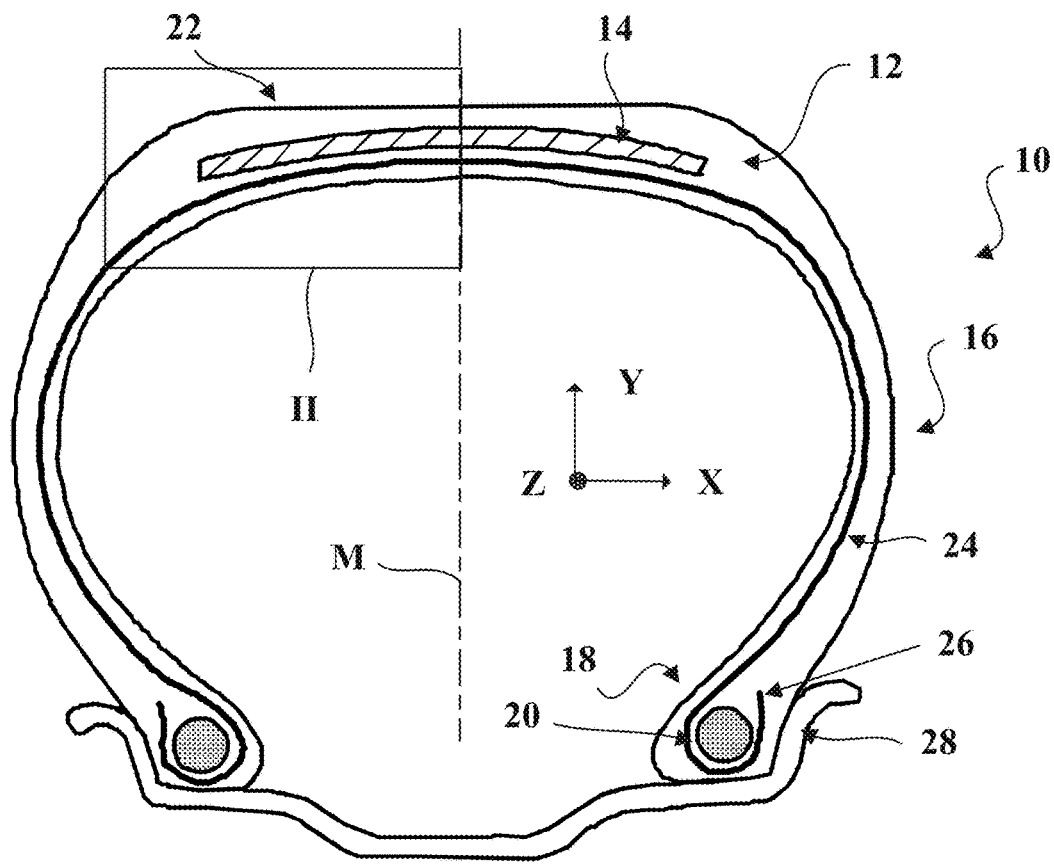
FIG. 1 is a view in cross section perpendicular to the circumferential direction of a tyre according to the invention.

What is meant by a polymer compound or a polymeric compound is that the compound contains at least one polymer. For preference, such a polymer may be a thermoplastic, for example a polyester or a polyamide, a thermosetting polymer, an elastomer, for example natural rubber, a thermoplastic elastomer or a combination of these polymers.

What is meant by an elastomer compound or an elastomeric compound is that the compound contains at least one elastomer or one rubber (the two terms being synonyms) and at least one other component. For preference, the elastomer compound also contains a vulcanization system and a filler. More preferentially, the elastomer is a diene elastomer.

In the description and the claims, any range of values denoted by the expression "between a and b" represents the range of values extending from more than a to less than b (namely excluding the end-points a and b), whereas any range of values denoted by the expression "from a to b" means the range of values extending from the end-point "a" as far as the end-point "b", namely including the strict end-points "a" and "b".

It will be recalled that, as is known, the pitch of a strand represents the length of this strand, measured parallel to the axis of the cord, after which the strand that has this pitch has made a complete turn around the said axis of the cord. Similarly, the pitch of a thread represents the length of this thread, measured parallel to the axis of the strand in which it is located, after which the thread that has this pitch has made a complete turn around the said axis of the strand.

What is meant by the direction of winding of a layer of strands or of threads is the direction that the strands or the threads form with respect to the axis of the cord or of the strand. The direction of winding is commonly designated by the letter Z or S.

The pitches, directions of winding, and diameters of the threads and of the strands are determined in accordance with standard ASTM D2969-04 of 2014. The radii of winding are measured by using a microscope to look at a cross section of the cord taken on an axis perpendicular to the axis of the cord.

What is meant by similar thread diameters is that the ratios of the diameters of the threads considered in pairs range from 0.75 to 1.25. What is meant by identical thread diameters is that the ratios of the diameters of the threads considered in pairs are equal to 1.

Advantageously, the cord is made of metal. What is meant by metal cord is, by definition, a cord formed of threads made entirely (100% of the threads) of a metallic material. Such a metal cord is preferentially implemented with threads made of steel, more preferentially of pearlitic (or ferritic-pearlitic) carbon steel referred to as "carbon steel" below, or else made of stainless steel (by definition, steel comprising at least 11% chromium and at least 50% iron). However, it is of course possible to use other steels or other alloys.

When a carbon steel is advantageously used, its carbon content (% by weight of steel) is preferably comprised between 0.2% and 1.2%, notably between 0.5% and 1.1%; these contents represent a good compromise between the mechanical properties required for the tyre and the workability of the threads.

The metal or the steel used, whether in particular it is a carbon steel or a stainless steel, may itself be coated with a metal layer which improves, for example, the workability properties of the metal cord and/or of its constituent elements, or the use properties of the cord and/or of the tyre themselves, such as the properties of adhesion, corrosion resistance or resistance to ageing. According to one preferred embodiment, the steel used is covered with a layer of brass (Zn—Cu alloy) or of zinc.

For preference, the threads of the one same layer of a predetermined (internal or external) strand all have substantially the same diameter. Advantageously, the internal strands all have substantially the same diameter. Advantageously, the external strands all have substantially the same diameter. What is meant by "substantially the same diameter" is that the threads or the strands have identical diameters to within the industrial tolerances.

In the present application, the modulus EC of a cord is calculated by measuring the gradient of the elastic portion of a force-elongation curve obtained by applying standard ASTM D2969-04 of 2014 to the cord tested, and then by apportioning this gradient to the metal cross section of the cord, namely the sum of the cross sections of the threads that make up the cord. Alternatively, the metal cross section can be determined by measuring the linear mass of the cord in accordance with standard ASTM D2969-04 of 2014, and by dividing this linear mass by the density of the steel used.

The elastic portion of the curve corresponds to a substantially linear portion of the force-elongation curve, which portion compliments the structural portion and the plastic portion of the force-elongation curve. The elastic portion corresponds to an elastic elongation Ae and is the result of the construction of the cord, notably of the angles of the various layers and of the diameters of the threads. The elastic portion, and the corresponding elongation Ae, of the force-elongation curve are notably described in documents U.S. Pat. No. 5,843,583, WO 2005/014925 and WO2007/090603 and correspond to the portion and to the elongation of the force-elongation curve comprised between:

- the structural portion corresponding to the structural elongation As, resulting from the aeration of the cord, namely the empty space between the various threads or strands that make up the cord, and
- the plastic portion corresponding to the plastic elongation Ap, resulting from the plasticity (irreversible deformation beyond the elastic limit) of one or more threads of the cord.

For certain cords, there is no aeration in the cord, which means that the structural elongation As is zero. In all cases (As zero and As non-zero), the elastic portion corresponds to the substantially linear portion of the force-elongation curve that has the steepest gradient.

The modulus EC of the cord is measured on an as-manufactured cord, namely a cord without any elastomeric compound in which the cord would be embedded in order to form a ply. Similarly, the modulus EI of the internal layer of the cord is measured by taking the internal layer of the cord either as-manufactured or by unravelling the external layer of external strands from the finished cord in order to obtain the internal layer of the cord alone. As an alternative, the modulus values EC and EI could be measured by extracting a cord from a tyre and removing all the elastomeric compound from around and within the cord, for example by chemical derubberizing as is well known to those skilled in the art.

As a preference, 95≤MC≤170, and more preferably, 110≤MC≤170. Within this interval, the modulus of the cord is even further away from the modulus of the cords of the prior art and makes it possible to reduce the damage caused by obstacles that highly stress the crown reinforcement of the tyre. In a particular variant, 140≤MC≤170, and preferably 150≤MC≤160.

In preferred embodiments, 77≤MI≤196. In these preferred embodiments, the modulus of the internal layer of the cord has a modulus EI advantageously such that 28 GPa≤EI≤180 GPa. In that particular variant, 153≤MI≤193 and 120 GPa≤EI≤170 GPa.

As the cords according to the invention have an architecture in which J>1, the most severe transverse loadings applied to the cord when the latter is tensioned are the transverse loadings applied between the internal strands, notably in instances in which the external layer of the cord is desaturated, unlike a cord in which J=1 and in which the most severe transverse loadings are the transverse loadings applied by the external strands to the internal strands, notably in instances in which the external layer of the cord is desaturated.

Thus, in a first variant in which the internal layer of the cord has a relatively low modulus, 77≤MI≤135. In this first variant, the modulus EI of the internal layer of the cord is advantageously such that 28 GPa≤EI≤94 GPa. Thus, the lower the modulus of the internal layer, the better the principal loadings will be reacted and the better the breaking strength of the cord will be. The breaking strength of the cord is maximized here by using a relatively low modulus for the internal layer.

In a second variant, the internal layer of the cord has a higher modulus, 136≤MI≤196. In this second variant, the modulus EI of the internal layer of the cord is advantageously such that 95 GPa≤EI≤180 GPa.

In preferred embodiments, 81≤ME≤182. In that particular variant, 120≤ME≤160.

In a first variant, the external layer of the cord having a relatively low modulus, 81≤ME≤120. In this first variant, because the modulus of the external layer is relatively low, the external layer is able to resist cutting following the stress loadings of indenting features. This then maximizes the resistance to cutting of the cord.

In a second variant, the external layer of the cord has a higher modulus, 121≤ME≤182. Because of the relatively low modulus of the cord, a relatively high value for the modulus of the external layer leads to a relatively low value for the modulus of the internal layer and therefore to the cord having excellent force at break.

In an embodiment in which the internal and external layers of the cord have relatively similar modulus values, 0.70≤ME/MI≤1.30. In this embodiment, the inventors are postulating the hypothesis that the core and the layer work more or less together when the cord is stressed, notably in tension. In this way, the compromise between the breaking strength of the cord and its resistance to cutting is maximized. In this embodiment, the internal layer of the cord and the cord have relatively similar EC and EI modulus values, advantageously such that 0.59≤EC/EI≤1.59. In that particular variant, 0.60≤EC/EI≤1.20.

In another embodiment in which the internal and external layers of the cord have relatively different modulus values, ME/MI≤0.69 or 1.31≤ME/MI.

In a variant, the internal layer of the cord has a relatively high modulus with respect to the modulus of the external layer of the cord, namely ME/MI≤0.69, preferably 0.45≤ME/MI≤0.69. In this variant, the internal layer of the cord has a relatively high modulus with respect to the modulus of the cord, namely advantageously such that EC/EI≤0.84, preferably 0.50≤EC/EI≤0.84. This variant favours the resistance of the cord to cutting over its breaking strength.

In another variant, the internal layer of the cord has a relatively low modulus with respect to the modulus of the external layer of the cord, namely 1.31≤ME/MI, preferably 1.31≤ME/MI≤1.90. In this other variant, the internal layer of the cord has a relatively low modulus with respect to the modulus of the cord, namely advantageously such that 1.04≤EC/EI, preferably 1.04≤EC/EI≤1.96. This variant favours the breaking strength of the cord over its resistance to cutting.

In preferred embodiments of the invention, the cords have the following advantageous structural characteristics.

In one embodiment, D1, D2, D3, D1' and D2' each range from 0.15 mm to 0.60 mm, preferably from 0.20 mm to 0.50 mm, more preferably from 0.23 mm to 0.45 mm and more preferably still, from 0.25 mm to 0.40 mm.

Advantageously, the internal layer of the cord is wound in a cord internal layer direction and each internal (when Q>1), intermediate and external layer of each internal strand is wound in the same direction of winding as the direction of the internal layer of the cord.

Advantageously, the external layer of the cord is wound in a cord external layer direction and each internal (when Q'>1) and external layer of each external strand is wound in the same direction of winding as the direction of the external layer of the cord.

In one embodiment, the direction of the internal layer of the cord and the direction of the external layer of the cord are opposite directions. In this embodiment, the risk of potential undesired slippage of the external strands in grooves formed between the internal strands is reduced as a result of a crossover between the internal and external strands.

In another embodiment, the direction of the internal layer of the cord and the direction of the external layer of the cord are the same. In this embodiment, manufacture is relatively easy because unlike in the preceding embodiment, there is no need to differentiate between the directions of winding of the internal and external layers of the cord. Nevertheless, contacts between the external threads of the external layers of the internal and external strands are relatively long and this may, with certain combinations of pitch, diameter and architecture of the cords, generate assembly defects caused for example by undesired slippage of the external strands in the grooves formed between the internal strands.

In one preferred embodiment, the helix angle α of each internal strand in the internal layer of the cord ranges from 4° to 36°. By controlling chiefly the value of the helix angle α, the value of the modulus associated with the internal layer of the cord is largely controlled. This is because the helix angle α plays a predominant role by comparison with the angles β, δ and γ whose contribution to the modulus is smaller. Thus, the higher the helix angle α of each internal strand, the lower the modulus associated with the internal layer. Thus, advantageously, the internal strands are wound in a helix with a pitch PI ranging from 10 mm to 65 mm, preferably from 10 mm to 45 mm. In that particular variant, the helix angle α ranges from 8° to 18°.

In one preferred embodiment, the helix angle α' of each external strand in the external layer of the cord ranges from 10° to 32°. In a similar way to the helix angle α, by controlling chiefly the value of the helix angle α', the value of the modulus associated with the external layer of the cord is largely controlled. This is because the helix angle α' plays a predominant role by comparison with the angles β' and γ' whose contribution to the modulus is smaller. Thus, the higher the helix angle α' of each external strand, the lower the modulus associated with the external layer. Advantageously, the L external strands are wound in a helix with a pitch PE ranging from 30 mm to 65 mm, preferably from 30 mm to 60 mm. In that particular variant, the helix angle α' ranges from 15° to 25°.

Advantageously, 26°≤3α+β+δ+γ≤162°. In an embodiment in which Q=1, advantageously 26°≤3α+β+δ+γ≤140°. In an embodiment in which Q>1, advantageously 36°≤3α+β+δ+γ≤162°. For identical or similar diameters of threads used, the angles thus defined make it possible to structurally define the internal layer of the cord and the internal strands of this layer in order to obtain a cord according to the invention that is easy to manufacture on an industrial scale by altering only the helix angles α, β, δ and γ. In that particular variant, 50°≤3α+β+δ+γ≤80°.

Advantageously, 28°≤2α'+β'+γ'≤96°. In an embodiment in which Q'=1, advantageously 28°≤2α'+β'+γ'≤86°. In an embodiment in which Q'>1, advantageously 34°≤2α'+β'+γ'≤96°. For identical or similar diameters of threads used, the angles thus defined make it possible to structurally define the external layer of the cord and the external strands of this layer in order to obtain a cord according to the invention that is easy to manufacture on an industrial scale by altering only the helix angles α', β' and γ'. In that particular variant, 43°≤2α'+β'+γ'≤63°.

Advantageously, 64°≤3α+β+δ+γ+2α'+β'+γ'≤224°. In an embodiment in which Q=1 and Q'=1, advantageously 64°≤3α+β+δ+γ+2α'+β'+γ'≤200°. In an embodiment in which Q>1 and Q'=1, advantageously 73°≤3α+β+δ+γ+2α'+β'+γ'≤212°. In an embodiment in which Q=1 and Q'>1, advantageously 68°≤3α+β+δ+γ+2α'+β'+γ'≤220°. In an embodiment in which Q>1 and Q'>1, advantageously 80°≤3α+β+δ+γ+2α'+β'+γ'≤224°. For identical or similar diameters of threads used, the angles thus defined make it possible to structurally define a cord according to the invention that is easy to manufacture on an industrial scale by altering only the helix angles α, α', β, β', δ, γ and γ'. In that particular variant, 110°≤3α+β+δ+γ+2α'+β'+γ'≤150°.

In an embodiment in which Q>1, the helix angle β of each internal thread in the internal layer within each internal strand ranges from 4° to 17°. Advantageously, when Q>1, the Q internal threads of each internal strand are assembled within each internal strand at a pitch p1 ranging from 5 to 15 mm. In that particular variant, β ranges from 7° to 17° and p1 ranges from 1 to 10 mm.

In an embodiment in which Q=1, the helix angle δ of each intermediate thread in the intermediate layer within each internal strand ranges from 6° to 30°. Advantageously, the P intermediate threads of each internal strand are assembled within each internal strand at a pitch p2 ranging from 5 to 20 mm.

In an embodiment in which Q>1, the helix angle δ of each intermediate thread in the intermediate layer within each internal strand ranges from 8° to 22°. Advantageously, the P intermediate threads of each internal strand are assembled within each internal strand at a pitch p2 ranging from 10 to 20 mm.

In that particular variant, δ ranges from 7° to 17° and p2 ranges from 2 to 20 mm.

In an embodiment in which Q=1, the helix angle γ of each external thread in the external layer within each internal strand ranges from 7° to 30°. Advantageously, the N external threads of each internal strand are assembled within each internal strand at a pitch p3 ranging from 10 to 40 mm.

In an embodiment in which Q>1, the helix angle γ of each external thread in the external layer within each internal strand ranges from 9° to 25°. Advantageously, the N external threads of each internal strand are assembled within each internal strand at a pitch p3 ranging from 10 to 40 mm.

In that particular variant, γ ranges from 7° to 17° and p3 ranges from 4 to 40 mm.

In an embodiment in which Q'>1, the helix angle β' of each internal thread in the internal layer within each external strand ranges from 4° to 17°. Advantageously, the Q' internal threads of each external strand are assembled within each external strand at a pitch p1' ranging from 5 to 20 mm. In that particular variant, β' ranges from 7° to 17° and p1' ranges from 2 to 20 mm.

In an embodiment in which Q'=1, the helix angle γ' of each external thread in the external layer within each external strand ranges from 7° to 20°. Advantageously, the N' external threads of each external strand are assembled within each external strand at a pitch p2' ranging from 5 to 40 mm.

In an embodiment in which Q'=1, the helix angle γ' of each external thread in the external layer within each external strand ranges from 5° to 26°. Advantageously, the N' external threads of each external strand are assembled within each external strand at a pitch p2' ranging from 5 to 30 mm.

In that particular variant, γ' ranges from 7° to 17° and p2' ranges from 4 to 40 mm.

The combinations of helix angles and of pitches described above lead to cords having the advantageous modulus values of the invention. In addition, the pitches p1, p1', p2, p2' and p3 within these preferred ranges make it possible to obtain a cord that exhibits mechanical properties compatible with tyre use, a relatively low cost and a relatively low linear cord weight.

Cords According to an Embodiment a of the Invention

In one embodiment, the cord has a relatively very low modulus and is such that 90≤MC≤161. In this embodiment, the ability of the cord to hug the obstacles encountered is favoured over the ability of the cord to provide the tyre with high steering capability. Such cords according to embodiment A advantageously have modulus values ranging from 50 GPa to 89 GPa and are thus referred to as very low-modulus cords.

In preferred variants of cords according to embodiment A, 77≤MI≤193. In these preferred variants, advantageously 28 GPa≤EI≤176 GPa.

In a first variant in which the internal layer of the cord according to embodiment A has a relatively low modulus, 77≤MI≤135. In this first variant, advantageously 28 GPa≤EI≤94 GPa. As explained above, the breaking strength of the cord is maximized here by using a relatively low modulus for the internal layer.

In a second variant in which the internal layer of the cord according to embodiment A has a higher modulus, 136≤MI≤193. In this second variant, advantageously 95 GPa≤EI≤176 GPa. Because of the very low modulus of the cord, a relatively high value for the modulus of the internal layer entails a relatively low value for the modulus of the external layer therefore leading to excellent resistance of the cord to cutting.

In preferred variants of cords according to embodiment A, $81 \leq ME \leq 174$.

In a first variant in which the external layer of the cord according to embodiment A has a relatively low modulus, $81 \leq ME \leq 120$. As explained above, the resistance of the cord to cutting is maximized here by using a relatively low modulus for the external layer.

In a second variant in which the external layer of the cord according to embodiment A has a higher modulus, $121 \leq ME \leq 174$. Because of the very low modulus of the cord, a relatively high value for the modulus of the external layer entails a relatively low value for the modulus of the internal layer therefore leading to excellent breaking strength of the cord.

In an embodiment in which the internal and external layers of the cord according to embodiment A have relatively similar modulus values, $0.70 \leq ME/MI \leq 1.30$. In this variant, the inventors are postulating the hypothesis that the core and the layer work more or less together when the cord according to embodiment A is stressed, notably in tension. In this variant, advantageously then $0.59 \leq EC/EI \leq 1.46$. In this way, the compromise between the breaking strength of the cord and its resistance to cutting is maximized.

In an embodiment in which the internal and external layers of the cord according to embodiment A have relatively different modulus values, $ME/MI \leq 0.69$ or $1.31 \leq ME/MI$.

In a variant, the internal layer of the cord according to embodiment A has a relatively high modulus with respect to the modulus of the external layer of the cord according to embodiment A, namely $ME/MI \leq 0.69$, preferably $0.59 \leq ME/MI \leq 0.69$. In this variant, advantageously then $EC/EI \leq 0.79$, preferably $0.50 \leq EC/EI \leq 0.79$. This variant favours the resistance of the cord to cutting over its breaking strength.

In another variant, the internal layer of the cord according to embodiment A has a relatively low modulus with respect to the modulus of the external layer of the cord according to embodiment A, namely $1.31 \leq ME/MI$, preferably $1.31 \leq ME/MI \leq 1.90$. In this variant, advantageously then $1.04 \leq EC/EI$, preferably $1.04 \leq EC/EI \leq 1.96$. This variant favours the breaking strength of the cord over its resistance to cutting.

In preferred variants, the cords according to embodiment A and with a very low modulus have the following advantageous structural characteristics.

Preferably, the helix angle $\alpha$ of each internal strand in the internal layer of the cord according to embodiment A ranges from 4° to 36°.

In one preferred embodiment, the helix angle $\alpha'$ of each external strand in the external layer of the cord according to embodiment A ranges from 13° to 32°.

As specified hereinabove, by controlling chiefly the value of the helix angles $\alpha$ and $\alpha'$, the value of the modulus associated with the internal and external layers of the cord is largely controlled. Thus, for relatively high helix angles $\alpha$ and $\alpha'$, relatively very low modulus values associated with these layers are obtained, making it possible to obtain a cord according to embodiment A, and which has a very low modulus.

Advantageously, $35° \leq 3\alpha+\beta+\delta+\gamma \leq 162°$. In an embodiment in which $Q=1$, advantageously $35° \leq 3\alpha+\beta+\delta+\gamma \leq 140°$. In an embodiment in which $Q>1$, advantageously $36° \leq 3\alpha+\beta+\delta+\gamma \leq 162°$. For identical or similar diameters of threads used, the angles thus defined make it possible to structurally define the internal layer of the cord and the internal strands of this layer in order to obtain a cord according to embodiment A of the invention that has a very low modulus and that is easy to manufacture on an industrial scale by altering only the helix angles $\alpha$, $\beta$, $\gamma$ and $\delta$.

Advantageously, $34° \leq 2\alpha'+\beta'+\gamma' \leq 96°$. In an embodiment in which $Q'=1$, advantageously $34° \leq 2\alpha'+\beta'+\gamma' \leq 86°$. In an embodiment in which $Q'>1$, advantageously $42° \leq 2\alpha'+\beta'+\gamma' \leq 96°$. For identical or similar diameters of threads used, the angles thus defined make it possible to structurally define the external layer of the cord and the external strands of this layer in order to obtain a cord according to embodiment A of the invention that has a very low modulus and that is easy to manufacture on an industrial scale by altering only the helix angles $\alpha'$, $\beta'$ and $\gamma'$.

Advantageously, $100° \leq 3\alpha+\beta+\delta+\gamma+2\alpha'+\beta'+\gamma' \leq 224°$. In an embodiment in which $Q=1$ and $Q'=1$, advantageously $100° \leq 3\alpha+\beta+\delta+\gamma+2\alpha'+\beta'+\gamma' \leq 200°$. In an embodiment in which $Q>1$ and $Q'=1$, advantageously $104° \leq 3\alpha+\beta+\delta+\gamma+2\alpha'+\beta'+\gamma' \leq 212°$. In an embodiment in which $Q=1$ and $Q'>1$, advantageously $117° \leq 3\alpha+\beta+\delta+\gamma+2\alpha'+\beta'+\gamma' \leq 220°$. In an embodiment in which $Q>1$ and $Q'>1$, advantageously $121° \leq 3\alpha+\beta+\delta+\gamma+2\alpha'+\beta'+\gamma' \leq 224°$. For identical or similar diameters of threads used, the angles thus defined make it possible to structurally define a cord according to embodiment A of the invention that has a very low modulus and that is easy to manufacture on an industrial scale by altering only the helix angles $\alpha$, $\alpha'$, $\beta$, $\beta'$, $\gamma$, $\gamma'$ and $\delta$.

The values for the helix angles $\beta$, $\gamma$, $\delta$, $\beta'$, $\gamma$, and those for the pitches p1, p2, p3, p1', p2' that make it possible to obtain cords according to embodiment A with a very low modulus are identical to those already described hereinabove.

Cords According to an Embodiment B of the Invention

In another embodiment, the cord has a relatively low modulus, and is such that $113 \leq MC \leq 174$, preferably $113 \leq MC \leq 170$. In this embodiment, a balanced compromise between the ability of the cord to hug the obstacles encountered and the ability of the cord to provide the tyre with high steering capability is adopted. Such cords according to embodiment B advantageously have modulus values ranging from 90 GPa to 130 GPa and are thus referred to as low-modulus cords.

In preferred variants of cords according to embodiment B, $118 \leq MI \leq 196$. Advantageously then $64$ GPa $\leq EI \leq 180$ GPa.

In a first variant in which the internal layer of the cord according to embodiment B has a relatively low modulus, $118 \leq MI \leq 135$. In this first variant, advantageously then $64$ GPa $\leq EI \leq 94$ GPa. As explained above, the breaking strength of the cord is maximized here by using a relatively low modulus for the internal layer.

In a second variant in which the internal layer of the cord according to embodiment B has a higher modulus, $136 \leq MI \leq 196$. In this second variant, then $95$ GPa $\leq EI \leq 180$ GPa.

In preferred variants of cords according to embodiment B, $82 \leq ME \leq 182$.

In a first variant in which the external layer of the cord according to embodiment B has a relatively low modulus, $82 \leq ME \leq 120$. As explained above, the resistance of the cord to cutting is maximized here by using a relatively low modulus for the external layer.

In a second variant in which the external layer of the cord according to embodiment B has a higher modulus, $121 \leq ME \leq 182$. Because of the low modulus of the cord, a relatively high value for the modulus of the external layer entails a relatively low value for the modulus of the internal layer therefore leading to excellent breaking strength of the cord.

In an embodiment in which the internal and external layers of the cord according to embodiment B have relatively similar modulus values, 0.70≤ME/MI≤1.30. In this variant, advantageously then 0.50≤EC/EI≤1.59. In this variant, the inventors are postulating the hypothesis that the core and the layer work more or less together when the cord according to embodiment B is stressed, notably in tension. In this way, the compromise between the breaking strength of the cord and its resistance to cutting is maximized.

In an embodiment in which the internal and external layers of the cord according to embodiment B have relatively different modulus values, ME/MI≤0.69 or 1.31≤ME/MI.

In a variant, the internal layer of the cord according to embodiment B has a relatively high modulus with respect to the modulus of the external layer of the cord according to embodiment B, namely ME/MI≤0.69, preferably 0.45≤ME/MI≤0.69. In this variant, advantageously then EC/EI≤0.80, preferably 0.50≤EC/EI≤0.80. This variant favours the resistance of the cord to cutting over its breaking strength.

In another variant, the internal layer of the cord according to embodiment B has a relatively low modulus with respect to the modulus of the external layer of the cord according to embodiment B, namely 1.31≤ME/MI, preferably 1.31≤ME/MI≤1.42. In this variant, advantageously then 1.14≤EC/EI, preferably 1.14≤EC/EI≤1.54. This variant favours the breaking strength of the cord over its resistance to cutting.

In preferred variants, the cords according to embodiment B with a low modulus have the following advantageous structural characteristics.

Preferably, the helix angle α of each internal strand in the internal layer of the cord according to embodiment B ranges from 4° to 27°.

In one preferred embodiment, the helix angle α' of each external strand in the external layer of the cord according to embodiment B ranges from 11° to 31°.

As specified hereinabove, by controlling chiefly the value of the helix angles α and α', the value of the modulus associated with the internal and external layers of the cord is largely controlled. Thus, for relatively medium helix angles α and α', relatively low modulus values associated with these layers are obtained, making it possible to obtain a cord according to embodiment B, and which has a low modulus.

Advantageously, 26°≤3α+β+δ+γ≤128°. In an embodiment in which Q=1, advantageously 26°≤3α+β+δ+γ≤113°. In an embodiment in which Q>1, advantageously 36°≤3α+β+δ+γ≤128°. For identical or similar diameters of threads used, the angles thus defined make it possible to structurally define the internal layer of the cord and the internal strands of this layer in order to obtain a cord according to embodiment B of the invention that has a low modulus and that is easy to manufacture on an industrial scale by altering only the helix angles α, β, γ and δ.

Advantageously, 28°≤2α'+β'+γ'≤89°. In an embodiment in which Q'=1, advantageously 28°≤2α'+β'+γ'≤85°. In an embodiment in which Q'>1, advantageously 36°≤2α'+β'+γ'≤89°. For identical or similar diameters of threads used, the angles thus defined make it possible to structurally define the external layer of the cord and the external strands of this layer in order to obtain a cord according to embodiment B of the invention that has a low modulus and that is easy to manufacture on an industrial scale by altering only the helix angles α', β' and γ'.

Advantageously, 74°≤3α+β+δ+γ+2α'+β'+γ'≤183°. In an embodiment in which Q=1 and Q'=1, advantageously 74°≤3α+β+δ+γ+2α'+β'+γ'≤158°. In an embodiment in which Q>1 and Q'=1, advantageously 86°≤3α+β+δ+γ+2α'+β'+γ'≤168°. In an embodiment in which Q=1 and Q'>1, advantageously 84°≤3α+β+δ+γ+2α'+β'+γ'≤168°. In an embodiment in which Q>1 and Q'>1, advantageously 94°≤3α+β+δ+γ+2α'+β'+γ'≤183°. For identical or similar diameters of threads used, the angles thus defined make it possible to structurally define a cord according to embodiment B of the invention that has a low modulus and that is easy to manufacture on an industrial scale by altering only the helix angles α, α', β, β', γ, γ' and δ.

The values for the helix angles β, γ, δ, β', γ, and those for the pitches p1, p2, p3, p1', p2' that make it possible to obtain cords according to embodiment B with a low modulus are identical to those already described hereinabove.

Cords According to an Embodiment C of the Invention

In yet another embodiment, the cord has a relatively medium modulus and is such that 142≤MC≤175, preferably 142≤MC≤170. In this embodiment, the ability of the cord to provide the tyre with high steering capability is favoured over the ability of the cord to hug the obstacles encountered. Such cords according to according to embodiment C according to embodiment C advantageously have modulus values ranging from 131 GPa to 160 GPa and are thus referred to as medium-modulus cords.

In preferred variants of cords according to embodiment C, 143≤MI≤196. Advantageously then 100 GPa≤EI≤180 GPa.

In preferred variants of cords according to embodiment C, 125≤ME≤182.

In an embodiment in which the internal and external layers of the cord according to embodiment C have relatively similar modulus values, 0.70≤ME/MI≤1.30, preferably 0.71≤ME/MI≤1.21. In this variant, advantageously then 0.74≤EC/EI≤1.44. In this variant embodiment, the inventors are postulating the hypothesis that the core and the layer work more or less together when the cord according to embodiment C is stressed, notably in tension. In this way, the compromise between the breaking strength of the cord and its resistance to cutting is maximized.

In an embodiment in which the internal and external layers of the cord according to embodiment C have relatively different modulus values, ME/MI≤0.69.

In a variant, the internal layer of the cord according to embodiment C has a relatively high modulus with respect to the modulus of the external layer of the cord according to embodiment B, that is to say ME/MI≤0.69, preferably 0.66≤ME/MI≤0.69. In this variant, then, advantageously EC/EI≤0.84, preferably 0.74≤EC/EI≤0.84. In this variant, the resistance of the cord to cutting is favoured over its breaking force.

In preferred variants, the cords according to embodiment C with a medium modulus have the following advantageous structural characteristics.

Preferably, the helix angle α of each internal strand in the internal layer of the cord according to embodiment C ranges from 4° to 23°.

In one preferred embodiment, the helix angle α' of each external strand in the external layer of the cord according to embodiment C ranges from 10° to 27°.

As specified hereinabove, by controlling chiefly the value of the helix angles α and α', the value of the modulus associated with the internal and external layers of the cord is largely controlled. Thus, for relatively small helix angles α and α', relatively medium modulus values associated with these layers are obtained, making it possible to obtain a cord according to embodiment C.

Advantageously, 26°≤3α+β+γ+5≤97°. In an embodiment in which Q=1, advantageously 26°≤3α+β+γ+5≤86°. In an embodiment in which Q>1, advantageously $36°≤3α+β+γ+5≤97°$. For identical or similar diameters of threads used, the angles thus defined make it possible to structurally define the internal layer of the cord and the internal strands of this layer in order to obtain a cord according to embodiment C of the invention that has a medium modulus and that is easy to manufacture on an industrial scale by altering only the helix angles $α$, $β$, $γ$ and $δ$.

Advantageously, $30°≤2α'+β'+γ'≤64°$. In an embodiment in which Q'=1, advantageously $30°≤2α'+β'+γ'≤62°$. In an embodiment in which Q'>1, advantageously $37°≤2α'+β'+γ'≤64°$. For identical or similar diameters of threads used, the angles thus defined make it possible to structurally define the external layer of the cord and the external strands of this layer in order to obtain a cord according to embodiment C of the invention that has a medium modulus and that is easy to manufacture on an industrial scale by altering only the helix angles $α'$, $β'$ and $γ'$.

Advantageously, $64°≤3α+β+γ+δ+2α'+β'+γ'≤135°$. In an embodiment in which Q=1 and Q'=1, advantageously $64°≤3α+β+γ+δ+2α'+β'+γ'≤117°$. In an embodiment in which Q'>1 and Q'=1, advantageously $73°≤3α+β+γ+δ+2α'+β'+γ'≤131°$. In an embodiment in which Q=1 and Q'>1, advantageously $68°≤3α+β+γ+δ+2α'+β'+γ'≤127°$. In an embodiment in which Q>1 and Q'>1, advantageously $80°≤3α+β+γ+δ+2α'+β'+γ'≤135°$. For identical or similar diameters of threads used, the angles thus defined make it possible to structurally define a cord according to embodiment C of the invention that has a medium modulus and that is easy to manufacture on an industrial scale by altering only the helix angles $α$, $α'$, $β$, $β'$, $γ$, $γ'$ and $δ$.

The values for the helix angles $β$, $γ$, $δ$, $β'$, $γ$, and those for the pitches $p1$, $p2$, $p3$, $p1'$, $p2'$ that make it possible to obtain cords according to embodiment C with a medium modulus are identical to those already described hereinabove.

Architecture of the Cords According to the Invention

Advantageously, J=2, 3 or 4, preferably J=3 or 4.

In one embodiment, L is equal to 7, 8, 9 or 10, preferably L=8, 9 or 10 and more preferentially L=8 or 9.

In a first variant, J=2 and L=7 or 8, preferably J=2, L=7.

In a second variant, J=3 and L=7, 8 or 9, preferably J=3, L=8 or 9. Instances in which L=8 favour the desaturation of the external layer of the cord and therefore the penetrability of the cord between the external strands. Instances in which L=9 maximize the number of external strands and therefore the breaking strength of the cord.

In a third variant, J=4 and L=7, 8, 9 or 10, preferably J=4, L=9.

In these embodiments, notably those in which J=3 or 4, there is a risk of seeing a significant spread of corrosive agents between the J=3 or 4 internal strands which delimit a central capillary which very much encourages them to spread along the cord, when the cord is insufficiently penetrated. This disadvantage can be overcome by rendering the cord capable of being penetrated by the elastomer compound which then prevents the corrosive agents from accessing the central capillary and, in the best of cases in which the central capillary is itself penetrated, prevents these corrosive agents from spreading along the cord.

Advantageously, the external layer of the cord is desaturated.

By definition, a desaturated layer of strands is such that there is enough space between the strands to allow an elastomer compound to pass. An external desaturated layer of strands means that the external strands do not touch and that there is enough space between two adjacent external strands to allow an elastomer compound to pass as far as the internal strands. By contrast, a saturated layer of strands is such that there is not enough space between the strands of the layer to allow an elastomer compound to pass, for example because each pair of two strands of the layer touch one another.

Advantageously, the inter-strand distance of the external layer of external strands, defined, on a cross section of the cord perpendicular to the main axis of the cord, as being the shortest distance separating, on average, the circular envelopes in which two adjacent external strands are inscribed, is greater than or equal to 30 μm. For preference, the mean inter-strand distance E separating two adjacent external strands is greater than or equal to 70 μm, more preferentially than/to 100 μm, more preferentially still than/to 150 μm, and highly preferentially than/to 200 μm.

As already explained hereinabove, as the cords according to the invention have an architecture in which J>1, the most severe transverse loadings applied to the cord when the latter is tensioned are the transverse loadings applied between the internal strands, unlike a cord in which J=1 and in which the most severe transverse loadings are the transverse loadings applied by the external strands to the internal strands. Cords exhibiting an architecture in which J>1 and comprising a number of external strands such that the external layer of the cord is saturated so as to maximize the breaking strength by adding a maximum number of external strands are known from the prior art. Here, thanks to the fact that the external layer of the cord is desaturated, the cord has, on the one hand, spaces between the external strands that allow the elastomer compound to pass, therefore allowing the cord to be rendered less sensitive to corrosion. On the other hand, although the number of external strands is reduced, the desaturation of the external layer of the cord allows the elastomer compound to penetrate, on the one hand, between the external strands and, on the other hand, between the internal strands so as to form a cushion of elastomer compound that at least partially absorbs the transverse loadings applied between the internal strands. Thus, by comparison with a similar cord having a saturated external layer of the cord, the breaking strength obtained is equivalent and the resistance to corrosion is greatly improved.

In an embodiment that promotes the penetrability of the cord, the external layer of the cord is completely unsaturated.

By definition, a completely unsaturated layer of strands is, as opposed to an incompletely unsaturated layer, such that there is sufficient space in this layer to add in at least one (X+1)th strand having the same diameter as the X strands of the layer, it thus being possible for a plurality of strands to be, or to not be, in contact with one another. In this particular instance, there is enough space in the external layer of the cord to add in at least one (L+1)th strand having the same diameter as the L external strands of the external layer of the cord.

Thus, advantageously, the sum SIE of the inter-strand distances E of the external layer of the cord is such that SIE≥DE. The sum SIE is the sum of the inter-strand distances E separating each pair of adjacent strands of the layer. The inter-strand distance of a layer is defined, in a section of the cord perpendicular to the main axis of the cord, as being the shortest distance, which, on average, separates two adjacent strands of the layer. Thus, the inter-strand distance E is calculated by dividing the sum SIE by the number of spaces separating the strands of the layer.

In another embodiment that promotes the compromise between penetrability and breaking strength, the external layer of the cord is incompletely unsaturated.

A layer that is incompletely unsaturated with strands is such that there is not enough space in this layer to add in at least one (X+1)th strand having the same diameter as the X strands of the layer. In this particular instance, there is not enough space in the external layer to add in at least one (L+1)th external strand having the same diameter as the L external strands of the external layer of the cord.

By definition, the diameter of the internal layer DI is the diameter of the smallest circle inside which the internal strands are circumscribed. The diameter of an external strand DE is the diameter of the smallest circle inside which the external strand is circumscribed. For relatively high values of DI/DE, the passage of the elastomer compound between the external strands is further promoted, and, for relatively low values of DI/DE, the architectural stability of the cord is ensured, the breaking strength is maximized while at the same time allowing the elastomer compound to pass between the external strands, the external diameter of the cord is limited, and the thickness of the ply is reduced, as therefore are the heating, rolling resistance and mass of the tyre.

Internal Strands of the Cords According to the Invention

In preferred embodiments, Q=1, 2, 3 or 4.

In one embodiment, Q=1, P=5 or 6 and N=10, 11 or 12, preferably Q=1, P=5 or 6 and N=10 or 11 and more preferentially Q=1, P=6 and N=11.

In preferred embodiments that make it possible to increase the breaking strength of the cord with respect to the embodiment in which Q=1, Q=2, 3 or 4, preferably Q=3 or 4.

In these preferred embodiments in which Q>1, notably those in which Q=3 or 4, there is a risk, when the strand is insufficiently penetrated, of seeing a significant spread of corrosive agents between the Q=3 or 4 internal threads which delimit a central capillary which very much encourages them to spread along each strand. This disadvantage can be overcome by rendering the strand capable of being penetrated by the elastomer compound which then prevents the corrosive agents from accessing the central capillary and, in the best of cases in which the central capillary is itself penetrated, prevents these corrosive agents from spreading along the strand.

In preferred embodiments in which Q>1, Q=2, 3 or 4, P=7, 8, 9 or 10, N=13, 14 or 15, preferably Q=3 or 4, P=8, 9 or 10, N=14 or 15, more preferentially Q=3, P=8 or 9 and N=14 or 15 and even more preferentially Q=3, P=9 and N=15.

Advantageously, the intermediate layer of each internal strand is desaturated.

By definition, a desaturated layer of threads is such that there is enough space between the threads to allow an elastomer compound to pass. Thus, a layer that is desaturated means that the threads of this layer do not touch and that there is enough space between two adjacent threads of the layer to allow an elastomer compound to pass through the layer. By contrast, a saturated layer of threads is such that there is not enough space between the threads of the layer to allow an elastomer compound to pass, for example because each pair of two threads of the layer touch one another.

Advantageously, the inter-thread distance of the intermediate layer of each internal strand is greater than or equal to 5 µm. For preference, the inter-thread distance of the intermediate layer of each internal strand is greater than or equal to 15 µm, more preferentially greater than or equal to 35 µm, more preferentially still greater than or equal to 50 µm and highly preferentially greater than or equal to 60 µm.

The fact that the intermediate layer of the internal strand is desaturated advantageously makes it easier for the elastomer compound to pass as far as the centre of each internal strand, and thus render each internal strand less sensitive to corrosion.

In an embodiment that promotes the compromise between penetrability of each internal strand and breaking strength, the intermediate layer of each internal strand is incompletely unsaturated.

By definition, a layer of threads that is incompletely unsaturated is such that there is not enough space in this layer to add in at least one (X+1)th thread having the same diameter as the X threads of the layer. In this particular instance, there is not enough space in the intermediate layer to add in at least one (P+1)th intermediate thread having the same diameter as the P intermediate threads of the intermediate layer.

The fact that the intermediate layer of the internal strand is incompletely unsaturated makes it possible to ensure an architectural stability of the intermediate layer. Furthermore, the fact that the intermediate layer of the internal strand is incompletely unsaturated makes it possible to ensure that the internal strand comprises a relatively high number of intermediate threads and therefore exhibits a relatively high breaking strength.

Thus, advantageously, the sum SI2 of the inter-thread distances of the intermediate layer is such that SI2<D3 where D3 is the diameter of each external thread of the internal strand, preferably SI2≤0.8×D3. The sum SI2 is the sum of the inter-thread distances separating each pair of adjacent threads of the intermediate layer. The inter-thread distance of a layer is defined, in a section of the cord perpendicular to the main axis of the cord, as being the shortest distance which, on average, separates two adjacent threads of the layer. Thus, the inter-thread distance is calculated by dividing the sum SI2 by the number of spaces separating the threads of the intermediate layer. Because the diameter D3 of the external threads of the external layer of the internal strand is preferentially greater than the sum SI2, the external threads are prevented from penetrating the intermediate layer. This then ensures good architectural stability, thereby additionally reducing the risk of alteration to the radial passage windows for the elastomer compound and therefore the risk of degrading the good penetrability of the internal strand.

In another embodiment that promotes the penetrability of each internal strand, the intermediate layer of each internal strand is completely unsaturated.

By definition, a completely unsaturated layer of threads is such that there is sufficient space in this layer to add in at least one (X+1)th thread having the same diameter as the X threads of the layer, it thus being possible for a plurality of threads to be in contact, or not in contact, with one another. In this particular instance, there is enough space in the intermediate layer of each internal strand to add in at least one (P+1)th intermediate thread having the same diameter as the P intermediate threads of the intermediate layer.

Such an embodiment is particularly advantageous when Q=3 and P=8 or Q=4 and P=9 and when D1=D2. Specifically, if we had Q=3 and P=9 or Q=4 and P=10, then the intermediate layer, although desaturated, might, in certain instances, have an inter-thread distance insufficient to ensure satisfactory penetrability of the strand.

Advantageously, the external layer of each internal strand is desaturated, preferably completely unsaturated.

As has already been specified, by definition, a desaturated layer of threads of threads is such that there is enough space between the threads to allow an elastomer compound to pass. Thus, a layer that is desaturated means that the threads of this layer do not touch and that there is enough space between two adjacent threads of the layer to allow an elastomer compound to pass through the layer. By contrast, a saturated layer of threads is such that there is not enough space between the threads of the layer to allow an elastomer compound to pass, for example because each pair of two threads of the layer touch one another.

Advantageously, the inter-thread distance of the external layer of each internal strand is greater than or equal to 5 µm. For preference, the inter-thread distance of the external layer of each internal strand is greater than or equal to 15 µm, more preferentially greater than or equal to 35 µm, more preferentially still greater than or equal to 50 µm and highly preferentially greater than or equal to 60 µm.

The fact that the external layer of each internal strand is desaturated advantageously makes it easier for the elastomer compound to pass as far as the centre of each internal strand, and thus render each internal strand less sensitive to corrosion.

By definition, a completely unsaturated layer of threads is such that there is sufficient space in this layer to add in at least one (X+1)th thread having the same diameter as the X threads of the layer, it thus being possible for a plurality of threads to be in contact, or not in contact, with one another. In this particular instance, there is enough space in the external layer of each internal strand to add in at least one (N+1)th external thread having the same diameter as the N external threads of the external layer.

The fact that the external layer of each internal strand is completely unsaturated makes it possible to maximise the penetration of the elastomer compound into each internal strand, and thus render each internal strand even less sensitive to corrosion.

Thus, advantageously, the sum SI3 of the inter-thread distances of the external layer of each internal strand is such that SI3≥D3. The sum SI3 is the sum of the inter-thread distances separating each pair of adjacent threads of the external layer. The inter-thread distance of a layer is defined, in a section of the cord perpendicular to the main axis of the cord, as being the shortest distance which, on average, separates two adjacent threads of the layer. Thus, the inter-thread distance is calculated by dividing the sum SI3 by the number of spaces separating the threads of the external layer.

In preferred embodiments, each internal thread of each internal strand has a diameter D1 greater than or equal to the diameter D2 of each intermediate thread of each internal strand. The use of diameters such that D1>D2 makes it possible to promote the penetrability of the elastomer compound through the intermediate layer. The use of diameters such that D1=D2 makes it possible to limit the number of different threads to be managed in the manufacture of the cord.

In preferred embodiments, each internal thread of each internal strand has a diameter D1 greater than or equal to the diameter D3 of each external thread of each internal strand. The use of diameters such that D1>D3 makes it possible to promote the penetrability of the elastomer compound through the external layer. The use of diameters such that D1=D3 makes it possible to limit the number of different threads to be managed in the manufacture of the cord.

In preferred embodiments, each intermediate thread of each internal strand has a diameter D2 equal to the diameter D3 of each external thread of each internal strand. The use of diameters such that D2=D3 makes it possible to limit the number of different threads to be managed in the manufacture of the cord.

Advantageously, each internal strand is of the type not rubberized in situ. What is meant by not rubberized in situ is that, prior to the assembly of the internal layer of the cord, and prior to the assembly of the cord, each internal strand is made up of the threads of the various layers and does not have any polymer compound, notably any elastomer compound.

External Strands of the Cord According to the Invention

In one embodiment, Q'=1. In this embodiment, N'=5 or 6, preferably N'=6.

In preferred embodiments that make it possible to increase the breaking strength of the cord with respect to the embodiment in which Q'=1, Q=2', 3 or 4, preferably Q'=3 or 4.

In these preferred embodiments in which Q'>1, notably those in which Q'=3 or 4, there is a risk, when the strand is insufficiently penetrated, of seeing a significant spread of corrosive agents between the Q'=3 or 4 internal threads which delimit a central capillary which very much encourages them to spread along each strand. This disadvantage can be overcome by rendering the strand capable of being penetrated by the elastomer compound which then prevents the corrosive agents from accessing the central capillary and, in the best of cases in which the central capillary is itself penetrated, prevents these corrosive agents from spreading along the strand.

In preferred embodiments of the embodiment in which Q'>1, N'=7, 8, 9 or 10, preferably N'=8, 9 or 10, N'=14 or 15, more preferentially N'=8 or 9.

In a first variant, Q'=2 and N'=7 or 8, preferably Q'=2, N'=7.

In a second variant, Q'=3 and N'=7, 8 or 9, preferably Q'=3, N'=8.

In a third variant, Q'=4 and N'=7, 8, 9 or 10, preferably Q'=4, N'=9.

Advantageously, the external layer of each external strand is desaturated, preferably completely unsaturated.

As has already been specified, by definition, a desaturated layer of threads of threads is such that there is enough space between the threads to allow an elastomer compound to pass. Thus, a layer that is desaturated means that the threads of this layer do not touch and that there is enough space between two adjacent threads of the layer to allow an elastomer compound to pass through the layer. By contrast, a saturated layer of threads is such that there is not enough space between the threads of the layer to allow an elastomer compound to pass, for example because each pair of two threads of the layer touch one another.

Advantageously, the inter-thread distance of the external layer of each external strand is greater than or equal to 5 µm. For preference, the inter-thread distance of the external layer of each external strand is greater than or equal to 15 µm, more preferentially greater than or equal to 35 µm, more preferentially still greater than or equal to 50 µm and highly preferentially greater than or equal to 60 µm.

The fact that the external layer of each external strand is desaturated advantageously makes it easier for the elastomer compound to pass as far as the centre of each external strand, and thus render each external strand less sensitive to corrosion.

By definition, a completely unsaturated layer of threads is such that there is sufficient space in this layer to add in at least one (X'+1)th thread having the same diameter as the X' threads of the layer, it thus being possible for a plurality of threads to be in contact, or not in contact, with one another. In this particular instance, there is enough space in the external layer of each external strand to add in at least one (N'+1)th external thread having the same diameter as the N' external threads of the external layer.

The fact that the external layer of each external strand is completely unsaturated makes it possible to maximize the penetration of the elastomer compound into each external strand, and thus render each external strand even less sensitive to corrosion.

Thus, advantageously, the sum SI2' of the inter-thread distances of the external layer of each internal strand is such that SI2'≥D2'. The sum SI2' is the sum of the inter-thread distances separating each pair of adjacent threads of the layer. The inter-thread distance of a layer is defined, in a section of the cord perpendicular to the main axis of the cord, as being the shortest distance which, on average, separates two adjacent threads of the layer. Thus, the inter-thread distance is calculated by dividing the sum SI2' by the number of spaces separating the threads of the layer.

By opposition, an incompletely unsaturated layer would be such that there would not be sufficient space in this layer to add thereto at least one (X'+1)th thread of the same diameter as the X' threads of the layer. In this instance, there would not be sufficient space in the external layer to add thereto at least one (N'+1)th external thread of the same diameter as the N external threads of the external layer.

In preferred embodiments, each internal thread of each external strand has a diameter D1' greater than or equal to the diameter D2' of each external thread of each external strand. The use of diameters such that D1'>D2' makes it possible to promote the penetrability of the elastomer compound through the external layer. The use of diameters such that D1'=D2' makes it possible to limit the number of different threads to be managed in the manufacture of the cord.

Advantageously, each external strand is of the type not rubberized in situ. What is meant by not rubberized in situ is that, prior to the assembly of the external layer of the cord, and prior to the assembly of the cord, each external strand is made up of the threads of the various layers and does not have any polymer compound, notably any elastomer compound.

Tyre According to the Invention

Another subject of the invention is a tyre comprising a carcass reinforcement anchored in two beads and surmounted radially by a crown reinforcement which is itself surmounted by a tread, the crown reinforcement being joined to the said beads by two sidewalls and comprising at least one cord as defined above.

The cord is most particularly intended for industrial vehicles selected from heavy vehicles such as "heavy-duty vehicles"—i.e. underground trains, buses, road haulage vehicles (lorries, tractors, trailers), off-road vehicles—, agricultural vehicles or construction plant vehicles, or other transport or handling vehicles.

As a preference, the tyre is for a vehicle of the construction plant type. The tyre has a size of the W R U type in which, as is known to those skilled in the art, W denotes:
  the nominal aspect ratio H/B as defined by the ETRTO, when it is in the form H/B, H being the cross-sectional height of the tyre and B being the cross-sectional width of the tyre,
  H.00 or B.00, when it is in the form H.00 or B.00, in which H=B, H and B being as defined above,
U represents the diameter, in inches, of the rim seat on which the tyre is intended to be mounted, and R denotes the type of carcass reinforcement of the tyre, in this case radial. Examples of such dimensions are, for example, 40.00 R 57 or else 59/80 R 63.

Preferably, U≥35, more preferentially U≥49 and even more preferentially U≥57.

Highly preferably, in one embodiment, the tyre is obtained by a method involving a step of embedding a cord as described hereinabove in a polymer matrix, preferably in an elastomer matrix, the cord, prior to the embedding step, being rid of any polymer or elastomer composition that may individually cover one or more, collectively cover several, internal strands of the internal layer of the cord.

Advantageously, the working reinforcement comprises at least first and second working plies, each first and second working ply respectively comprising first and second filamentary metal working reinforcing elements arranged substantially parallel to one another in each first and second working ply, each first and second filamentary metal working reinforcing element being formed by a cord as defined above.

In one embodiment, each first and second filamentary metal working reinforcing element makes an angle at most equal to 60°, preferably ranging from 15° to 40° with the circumferential direction of the tyre.

In one advantageous embodiment, the crown reinforcement comprises a protective reinforcement comprising first and second protective plies, each first and second protective ply respectively comprising first and second filamentary metal protective reinforcing elements arranged substantially parallel to one another in each first and second protective ply, each first and second filamentary metal protective reinforcing element making an angle at least equal to 10°, preferably ranging from 10° to 35° and preferentially from 15° to 30° with the circumferential direction of the tyre.

In a preferred embodiment, the protective reinforcement is interposed radially between the tread and the working reinforcement.

Advantageously, the crown reinforcement comprises an additional reinforcement comprising first and second additional plies, each first and second additional ply respectively comprising first and second additional filamentary metal reinforcing elements arranged substantially parallel to one another in each first and second additional ply, each first and second additional filamentary metal reinforcing element making an angle at most equal to 10°, preferably ranging from 5° to 10° with the circumferential direction of the tyre 10.

Advantageously, the carcass reinforcement comprises at least one carcass ply comprising filamentary metal carcass reinforcing elements arranged substantially parallel to one another in the carcass ply, each filamentary metal carcass reinforcing element making an angle of between 80° and 90° with the circumferential direction of the tyre.

The invention will be better understood on reading the following description, given solely by way of non-limiting example and with reference to the drawings.

Example of a Tyre According to the Invention

A frame of reference X, Y, Z corresponding to the usual respectively axial (X), radial (Y) and circumferential (Z) orientations of a tyre has been depicted in the figures.

The "median circumferential plane" M of the tyre is the plane which is normal to the axis of rotation of the tyre and which is situated equidistant from the annular reinforcing structures of each bead, and passes through the middle of the crown reinforcement.

Figure 2:
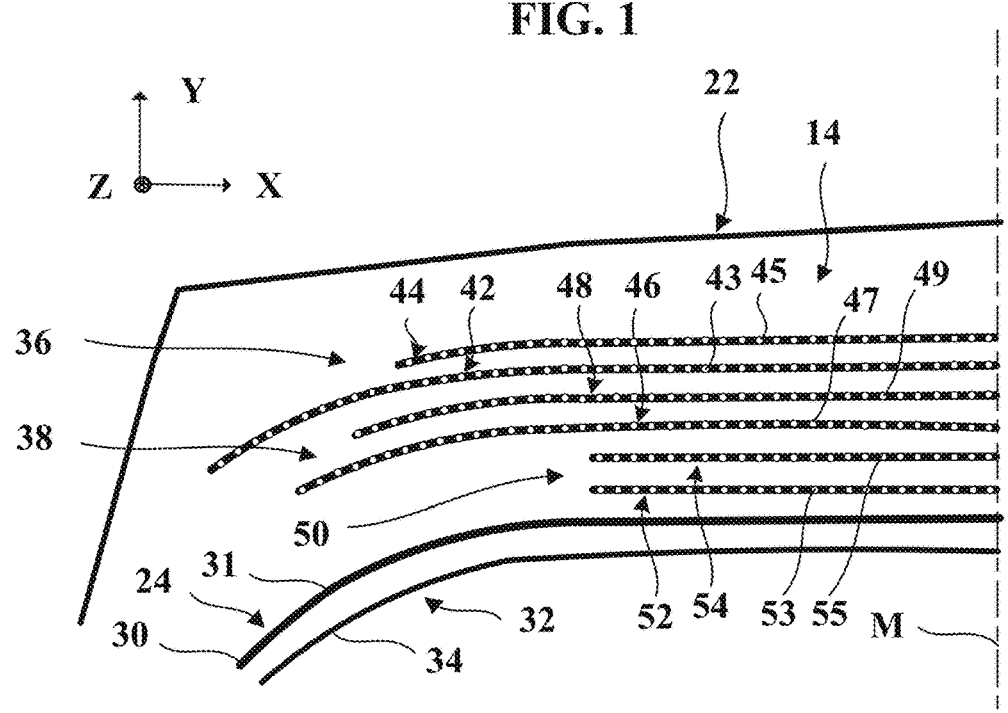
FIG. 2 is a detail view of the region II of FIG. 1.

FIGS. 1 and 2 depict a tyre according to the invention and denoted by the general reference 10.

The tyre 10 is for a heavy vehicle of construction plant type, for example of "dumper" type. Thus, the tyre 10 has a dimension of the type 53180R63.

The tyre 10 has a crown 12 reinforced by a crown reinforcement 14, two sidewalls 16 and two beads 18, each of these beads 18 being reinforced with an annular structure, in this instance a bead wire 20. The crown reinforcement 14 is surmounted radially by a tread 22 and connected to the beads 18 by the sidewalls 16. A carcass reinforcement 24 is anchored in the two beads 18 and is in this instance wound around the two bead wires 20 and comprises a turnup 26 positioned towards the outside of the tyre 20, which is shown here fitted onto a wheel rim 28. The carcass reinforcement 24 is surmounted radially by the crown reinforcement 14.

The carcass reinforcement 24 comprises at least one carcass ply 30 comprising filamentary metal carcass reinforcing elements 31 arranged substantially parallel to one another in the carcass ply 30 and extending from one bead 18 to the other so as to form an angle of between 80° and 90° with the circumferential direction Z of the tyre 10.

The tyre 10 also comprises a sealing ply 32 made up of an elastomer (commonly known as "inner liner") which defines the radially internal face 34 of the tyre 10 and which is intended to protect the carcass ply 30 from the diffusion of air coming from the space inside the tyre 10.

The crown reinforcement 14 comprises, radially from the outside towards the inside of the tyre 10, a protective reinforcement 36 arranged radially on the inside of the tread 22, a working reinforcement 38 arranged radially on the inside of the protective reinforcement 36 and an additional reinforcement 50 arranged radially on the inside of the working reinforcement 38. The protective reinforcement 36 is thus interposed radially between the tread 22 and the working reinforcement 38. The working reinforcement 38 is interposed radially between the protective reinforcement 36 and the additional reinforcement 50.

The protective reinforcement 36 comprises first and second protective plies 42, 44, the first ply 42 being arranged radially on the inside of the second ply 44. Each first and second protective ply 42, 44 respectively comprises first and second filamentary metal protective reinforcing elements 43, 45 arranged substantially parallel to one another in each first and second protective ply 42, 44. Each first and second filamentary metal protective reinforcing element 43, 45 makes an angle at least equal to 10°, preferably ranging from 10° to 35° and preferentially from 15° to 30°, with the circumferential direction Z of the tyre.

The working reinforcement 38 comprises first and second working plies 46, 48, the first ply 46 being arranged radially on the inside of the second ply 48. Each ply 46, 48 comprises at least one cord 60. Each first and second working ply 46, 48 respectively comprises first and second filamentary metal working reinforcing elements 47, 49 arranged substantially parallel to one another in each first and second working ply 46, 48. Each first and second filamentary metal working reinforcing element 47, 49 is formed here by a cord 60 described hereinafter. Each first and second filamentary metal working reinforcing element 47, 49 makes an angle at most equal to 60°, preferably ranging from 15° to 40°, with the circumferential direction Z of the tyre 10. Optionally, the first and second filamentary metal working reinforcing elements 47, 49 are crossed from one working ply to the other.

The additional reinforcement 50, also referred to as the limiting block, the function of which is to partially react the mechanical stresses of inflation, comprises first and second additional plies 52, 54, each first and second additional ply 52, 54 respectively comprising first and second additional filamentary metal reinforcing elements 53, 55 arranged substantially parallel to one another in each first and second additional ply 52, 54. Each first and second additional filamentary metal reinforcing element 53, 55 makes an angle at most equal to 10°, preferably ranging from 5° to 10°, with the circumferential direction Z of the tyre 10. The additional filamentary metal reinforcing elements are, for example, as described in FR 2 419 181 or FR 2 419 182.

Cord According to a First Embodiment of the Invention

Figure 3:
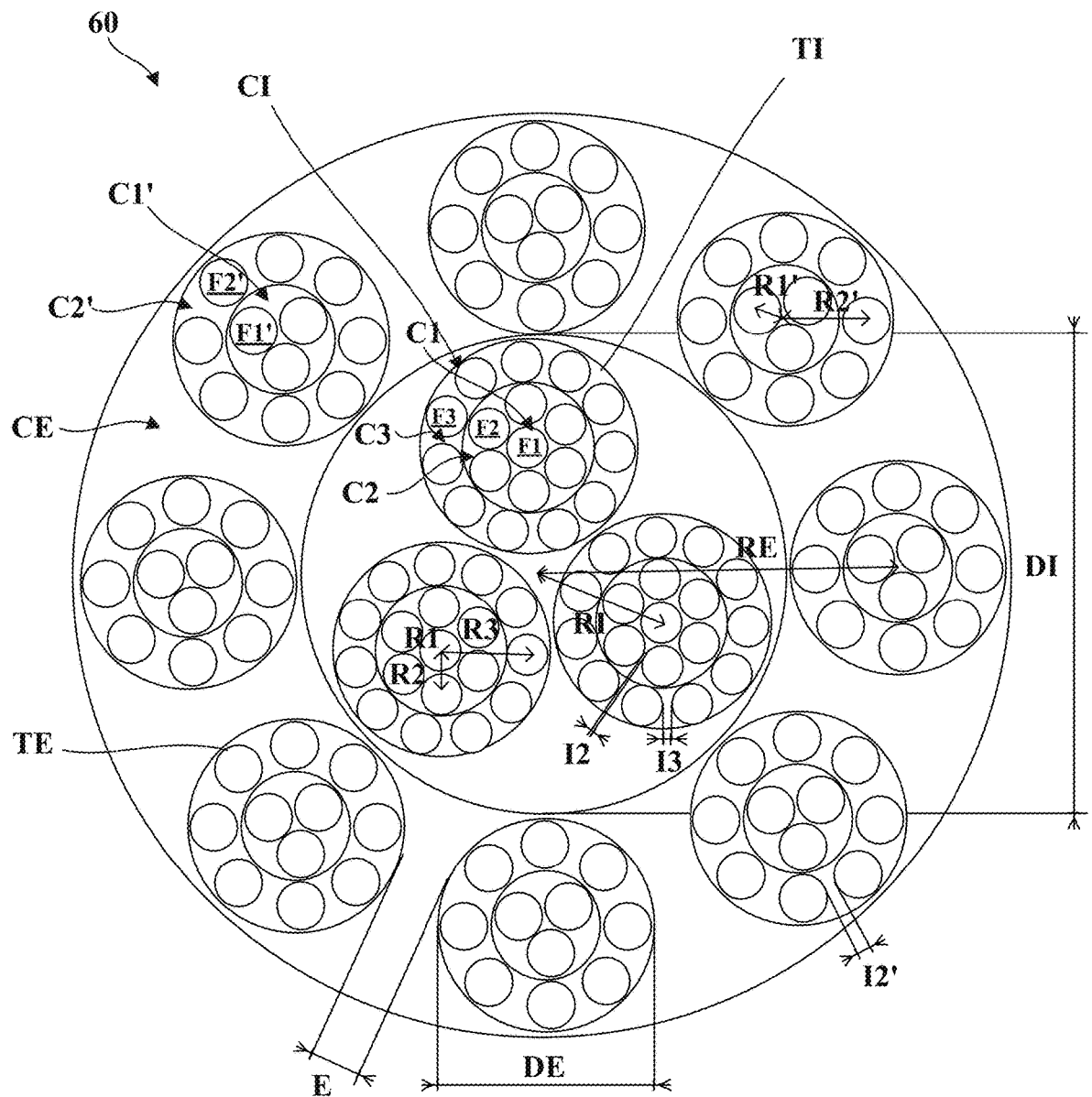
FIG. 3 is a schematic view in cross section perpendicular to the axis of the cord (which is assumed to be straight and at rest) of a cord according to a first embodiment of the invention.

FIG. 3 depicts the cord 60 according to embodiment B with a low modulus according to a first embodiment of the invention.

The cord 60 is metal and of the multi-strand type with two cylindrical layers. Thus, it will be understood that there are two layers, not more, not less, of strands of which the cord 60 is made. The layers of strands are adjacent and concentric. The cord 60 is devoid of polymer compound and of elastomer compound when it is not integrated into the tyre.

The cord 60 comprises an internal layer CI of the cord 60, and an external layer CE of the cord 60. The internal layer CI is made up of J>1 internal strands TI, namely of several internal strands TI, wound in a helix. The external layer CE is made up of L>1 external strands, namely of several external strands TE wound in a helix around the internal layer C1. In this instance, J=2, 3 or 4, preferably J=3 or 4. In addition, L=7, 8, 9 or 10, preferably L=8, 9 or 10. With J=3, L=7, 8 or 9 and in this instance and here J=3, L=8.

The cord 60 also comprises a wrapper F made up of a single wrapping wire.

The internal layer CI is wound in a helix in a direction of winding of the internal layer of the cord, here the direction S. The internal strands TI are wound in a helix with a pitch PI such that 10 mm≤PI≤65 mm and preferably 10 mm≤PI≤45 mm. Here, P1=20 mm. The helix angle α of each internal strand TI in the internal layer CI of the cord 60 ranges from 4° to 36° and in the embodiment of the cord 60 according to embodiment B from 4° to 27°, in this instance α=13.4°.

The external layer CE is wound in a helix around the internal layer CI in a direction of winding of the external layer of the cord that is the opposite of the direction of winding of the internal layer of the cord, here the direction Z. The external strands TE are wound in a helix around the internal strand TI with a pitch PE such that 30 mm≤PE≤65 mm and preferably 30 mm≤PE≤60 mm. Here, PE=40 mm. The helix angle α' of each external strand TE in the external layer CE of the cord 60 ranges from 10° to 32° and, in the embodiment of the cord 60 according to embodiment B, from from 11° to 31°, in this instance α'=8.6°.

The wrapper F is wound around the external layer CE in a direction of winding of the wrapper, here the opposite to the direction of winding of the external layer CE, in this instance in the S-direction. The wrapping wire is wound in a helix around the external strands TE with a pitch PF such that 2 mm≤PF≤10 mm and preferably, 3 mm≤PF≤8 mm. Here, PF=5.1 mm.

The assembly made up of the internal CI and external CE layers, which means to say the cord 60 without the wrapper F, has a diameter D greater than or equal to 4 mm, preferably greater than or equal to 4.5 mm, and less than or equal to 7 mm, preferably less than or equal to 6.5 mm. Here, D=5.7 mm.

The internal layer CI of internal strands TI has a diameter DI. Each external strand TE has a diameter DE. In this instance, DI=2.83 mm, DE=1.46 mm.

The external layer CE of the cord 60 is desaturated and incompletely unsaturated. The mean inter-strand distance E separating two adjacent external strands TE is greater than or equal to 30 µm, preferably greater than or equal to 70 µm and more preferentially greater than or equal to 100 µm. Here, the mean inter-strand distance E separating two adjacent external strands TE is such that E=117 µm. The sum SIE of the inter-thread distances E of the external layer CE is less than the diameter DE of the external strands of the external layer CE. Here, the sum SIE=8×0.117=0.94 mm, which is a value strictly less than DE=1.46 mm.

Internal Strands TI of the Cord 60

Each internal strand TI has three layers. Each internal strand TI comprises, here is made up of, three layers, not more, not less.

Each internal strand TI comprises an internal layer C1 made up of Q≥1 internal threads F1, an intermediate layer C2 made up of P>1 intermediate threads F2 wound in a helix around and in contact with the internal layer C1 and an external layer C3 made up of N>1 external threads F3 wound in a helix around and in contact with the intermediate layer C2.

Q=1, P=5 or 6 and N=10, 11 or 12, preferably Q=1, P=5 or 6, N=10 or 11 and more preferentially here Q=1, P=6 and N=11.

In the case where Q>1, the internal layer C1 of each internal strand TI is wound in a helix in a direction of winding of the internal layer C1 of the internal strand TI that is identical to the direction of winding of the internal layer CI of the cord, here in the S-direction. Here, the Q=1 internal thread F1 is assembled within each internal strand TI at an infinite pitch such that β=0.

The intermediate layer C2 of each internal strand TI is wound around and in contact with the internal layer C1 in a direction of winding of the intermediate layer C2 of the internal strand TI that is identical to the direction of winding of the internal layer CI of the cord, here in the S-direction. The P intermediate threads F2 are wound in a helix around the Q=1 internal thread F1 and are assembled within each internal strand TI at a pitch p2 such that 5 mm≤p2≤20 mm. Here, p2=7.7 mm. The helix angle δ of each intermediate thread F2 in the intermediate layer C2 within each internal strand TI ranges from 6° to 30°, here δ=12.2°.

The external layer C3 of each internal strand TI is wound around and in contact with the intermediate layer C2 in a direction of winding of the external layer C3 of the internal strand TI that is identical to the direction of winding of the internal layer CI of the cord, here in the S-direction. The N external threads F3 are wound in a helix around the P intermediate threads F2 and are assembled within each internal strand TI at a pitch p3 such that 10 mm≤p3≤40 mm. Here, p3=15.4 mm. The helix angle γ of each external thread F3 in the external layer C3 within each internal strand TI ranges from 7° to 30°, here γ=12.1°.

26°≤3α+β+δ+γ≤162° and in this instance, because Q=1, 26°≤3α+β+δ+γ—140°. In this particular instance, in this first embodiment of the cord 60 according to embodiment B, 26°≤3α+β+δ+γ≤128° and in this instance, because Q=1, 26°≤3α+β+δ+γ≤113°. In the case of the cord 60, 3α+β+δ+γ=64.5°.

Each internal thread F1, intermediate thread F2 and external thread F3 of each internal strand TI has, respectively, a diameter D1, D2, D3. Each diameter of the internal threads D1, of the intermediate threads D2 and of the external threads D3 of each internal strand TI ranges from 0.15 mm to 0.60 mm, preferably from 0.20 mm to 0.50 mm, more preferably from 0.23 mm to 0.45 mm and more preferably still from 0.25 mm to 0.40 mm. Each internal thread F1 of each internal strand TI has a diameter D1 greater than or equal to, and in this instance equal to, the diameter D2 of each intermediate thread F2 of each internal strand TI. Each internal thread F1 of each internal strand TI has a diameter D1 greater than or equal to, in this instance equal to, the diameter D3 of each external thread F3 of each internal strand TI. Each intermediate thread F2 of each internal strand TI has a diameter D2 equal to the diameter D3 of each external thread F3 of each internal strand TI. In this particular instance, D1=D2=D3=0.26 mm.

The intermediate layer C2 of each internal strand TI is saturated. Here, the distance I2 is approximately equal to 0.

The external layer C3 of each internal strand TI is desaturated and completely unsaturated. The inter-thread distance 13 of the external layer C3 on average separating the N external threads is greater than or equal to 5 µm. The inter-thread distance 13 is preferably greater than or equal to 15 µm and in this instance is equal to 30 µm. The sum SI3 of the inter-thread distances 13 of the external layer C3 is greater than the diameter D3 of the external threads F3 of the external layer C3. In this instance, the sum SI3=11×0.030=0.33 mm, which is a value strictly higher than D2=0.26 mm.

From the values described hereinabove, it is possible to calculate the indicator MI=200×cos$^4$(α)×[Q×(D1/2)$^2$×cos$^4$(β)+P×(D2/2)$^2$×cos$^4$(δ)+N×(D3/2)$^2$×cos$^4$(γ)]/[Q×(D1/2)$^2$+P×(D2/2)$^2$+N×(D3/2)$^2$] where D1, D2 and D3 are expressed in mm, α, β, 6 and γ are expressed in degrees and as defined hereinabove.

77≤MI≤196. In the case of the cord 60 according to embodiment B, 118≤MI≤196.

The cord 60 having an internal layer of the cord with a relatively high modulus, 136≤MI≤196. In this particular instance, MI=173.

Also, 28 GPa≤EI≤180 GPa. In the case of the cord 60 according to embodiment B, 64 GPa≤EI≤180 GPa. In this instance, the internal layer has a relatively high modulus, 95 GPa≤EI≤180 GPa. In this particular instance, EI=147 GPa.

External Strands TE of the Cord 60

Each external strand TE has two layers. Thus, each external strand TE comprises, here is made up of, two layers, not more, not less.

Each external strand TE comprises an internal layer C1' made up of Q'≥1 internal threads F1' and an external layer C2' made up of N'>1 external threads F2' wound in a helix around and in contact with the internal layer C2'.

Q'=2, 3 or 4, preferably Q'=3 or 4. N'=7, 8, 9 or 10, preferably N'=8, 9 or 10. With Q'=3, N'=7, 8 or 9 and in this particular instance Q'=3, N'=8.

The internal layer C1' of each external strand TE is wound in a helix in a direction of winding of the internal layer C1' of the external strand TE that is identical to the direction of winding of the external layer CE of the cord, here in the Z-direction. The Q' internal threads F1' are assembled within each external strand TE at a pitch p1' such that 5 mm≤p1'≤20 mm. Here, p1'=7.7 mm. The helix angle β' of each internal thread F1' in the internal layer C1' within each external strand TE ranges from 4° to 17°, here β'=9.4°.

The external layer C2' of each external strand TE is wound around and in contact with the internal layer C1' in a direction of winding of the external layer C2' of the external strand TE that is identical to the direction of winding of the external layer CE of the cord, here in the Z-direction. The N' external threads F2' are wound in a helix around the Q' internal threads F1' and are assembled within each external strand TE at a pitch p2' such that 5 mm≤p2'≤40 mm. Here, p2'=15.4 mm. The helix angle γ' of each external thread F2' in the external layer C2' within each external strand TE ranges from 7° to 22°, here γ'=12.7°.

28°≤2α'+β'+γ'≤96° and in this instance, because Q'>1, 34°≤2α'+β'+γ'≤96°. In this particular instance, in this first embodiment of the cord 60 according to embodiment B, 28°≤2α'+β'+γ'≤89° and in this instance, because Q'=1, 36°≤2α'+β'+γ'≤89°. In the case of the cord 60, 2α'+β'+γ'=59.3°.

Each internal F1' and external F2' thread of each external strand TE respectively has a diameter D1', D2'. Each diameter of the internal D1' and external threads D2' of each external strand TE ranges from 0.15 mm to 0.60 mm, preferably from 0.20 mm to 0.50 mm, more preferentially from 0.23 mm to 0.45 mm and more preferentially still from 0.25 mm to 0.40 mm. Each Q' internal thread F1' of each external strand TI' has a diameter D1' greater than or equal to, here equal to, the diameter D2' of each external thread F2' of each external strand TE. In this instance, D1'=D2'=0.35 mm.

The external layer C2' of each external strand TE is desaturated and completely unsaturated. The inter-thread distance I2' of the external layer C2' on average separating the N' external threads is greater than or equal to 5 μm. The inter-thread distance I2' is preferably greater than or equal to 15 μm, more preferably greater than or equal to 35 μm, and more preferably still greater than or equal to 50 μm and very preferably greater than or equal to 66 μm and here equal to 66 μm. The sum SI2' of the inter-thread distances I2' of the external layer C2' is greater than the diameter D2 of the external threads F2' of the external layer C2'. In this instance, the sum SI2'=8×0.066=0.53 mm, which is a value strictly higher than D2'=0.35 mm.

From the values described hereinabove, it is possible to calculate $ME=200\times\cos^4(\alpha')\times[Q'\times(D1'/2)^2\times\cos^4(\beta')+N'\times(D2'/2)^2\times\cos^4(\gamma')]/[Q'\times(D1'/2)^2+N'\times(D2'/2)^2]$ where D1 and D2 are expressed in mm, α', β' and γ' are expressed in degrees and as defined hereinabove.

81≤ME≤182. Here, the external layer has a relatively high modulus, 121≤ME≤182. In this particular instance, ME=148.

Each thread F1, F2, F3, F1', F2' has a breaking strength, denoted Rm, such that 2500≤Rm≤3100 MPa. The steel for these threads is said to be of SHT ("Super High Tensile") grade. Other threads may be used, for example threads of an inferior grade, for example of NT ("Normal Tensile") or HT ("High Tensile") grade, just as may threads of a superior grade, for example of UT ("Ultra Tensile") or MT ("Mega Tensile") grade.

64°≤3α+β+δ+γ+2α'+β'+γ'≤224°. In this particular instance, because Q=1 and Q'>1, 68°≤3α+β+δ+γ+2α'+β'+γ'≤220°. In the embodiment of the cord 60 according to embodiment B, 74°≤3α+β+δ+γ+2α'+β'+γ'≤183° and because Q=1 and Q'>1, 84°≤3α+β+δ+γ+2α'+β'+γ'≤168° and in this instance 3α+β+δ+γ+2α'+β'+γ'=123.8°.

0.70≤ME/MI≤1.30 and in this instance ME/MI=0.85. 0.59≤EC/EI≤1.59 and in this instance EC/EI=0.75.

According to the invention, the indicator MC=(J×MI+L×ME)/(J+L) is such that 95≤MC≤175, preferably 95≤MC≤170 and more preferably 110≤MC≤170. In the embodiment of the cord 60 according to embodiment B, 113≤MC≤174, preferably 113 MC≤170. In this particular instance, MC=155.

We also have 50 GPa≤EC≤160 GPa and in this embodiment of the cord 60 according to embodiment B, 90 GPa≤EC≤130 GPa, which makes the cord 60 a low-modulus cord. In this instance EC=111 GPa.

Method for Manufacturing the Cord According to the Invention

The cord according to the invention is manufactured using a method comprising steps well known to those skilled in the art.

In a step for manufacturing the internal strands using the following steps, preferably carried out in line and continuously:
- first of all, a first step of assembling, by twisting, the Q internal threads F1 of the internal layer C1 at the pitch p1 and in the S-direction to form the internal layer C1 at a first assembling point; here because Q=1, the first assembling step is avoided;
- followed by a second step of assembling, by twisting, the P intermediate threads F2 around the Q internal threads F1 of the internal layer C1 at the pitch p2 and in the S-direction to form the intermediate layer C2 at a second assembling point;
- followed by a third step of assembling, by twisting, the N external threads F3 around the P intermediate threads F2 of the intermediate layer C2 at the pitch p3 and in the S-direction to form the external layer C3 and each internal strand TI at a third assembling point;
- preferably a final twist-balancing step.

In a step for manufacturing the external strands using the following steps, preferably carried out in line and continuously:
- first of all, a first step of assembling, by twisting, the Q' internal threads F1' of the internal layer C1' at the pitch p1' and in the Z-direction to form the internal layer C1' at a first assembling point;
- followed by a second step of assembling, by twisting, the N' external threads F2' around the N' internal threads F1' of the internal layer C1' at the pitch p2' and in the Z-direction to form the external layer C2' and each external strand TE at a second assembling point;
- preferably a final twist-balancing step.

What is meant here by "twist balancing" is, as is well known to those skilled in the art, the cancellation of the residual twist torques (or the elastic return of the twist) applied to each thread of the strand, in the intermediate layer as in the external layer.

After this final twist-balancing step, the manufacture of each strand is complete. Each strand is wound onto one or more receiving reels, for storage, prior to the later operation of assembling the elementary strands in order to obtain the multi-strand cord.

In order to manufacture the multi-strand cord of the invention, the method, as is well known to those skilled in the art, is to cable together the strands previously obtained, using cabling machines rated for assembling strands.

In a step of manufacturing the internal layer CI, the Q internal strands TI are assembled by cabling at the pitch PI and in the S-direction to form the internal layer CI at a first assembling point. In the embodiments in which the pitch PI is relatively short and therefore in which α is relatively high, the Q internal strands TI are assembled by twisting in order to limit the risk of instability of the internal layer CI of the strands TI.

Then, in a later manufacturing step, the L external strands TE are assembled by cabling around the internal layer CI at the pitch PE and in the Z-direction to form the assembly of the layers CI and CE. In the embodiments in which the pitch PE is relatively short and therefore in which α' is relatively high, the L external stands TE are assembled by twisting in order to limit the risk of instability of the external layer CE of the strands TE.

In a second manufacturing step, the wrapper F is wound, at the pitch PF and in the S-direction, around the assembly previously obtained.

The tyre 10 is obtained by a method involving a step of embedding cords 60 in a polymer matrix of a polymer composition, in this instance an elastomer composition such as, for example, described hereinbelow. Each cord 60 is, prior to the embedding step, rid of any polymer or elastomer composition individually covering one or more, or collectively covering several, internal strands TI of the internal layer CI of the cord 60.

The cord is then incorporated by skimming into composite fabrics formed from a known composition based on natural rubber and carbon black as reinforcing filler, conventionally used for manufacturing crown reinforcements of radial tyres. This compound essentially contains, in addition to the elastomer and the reinforcing filler (carbon black), an antioxidant, stearic acid, an extender oil, cobalt naphthenate as adhesion promoter, and finally a vulcanization system (sulfur, accelerator and ZnO).

The composite fabrics reinforced by these cords have an elastomer compound matrix formed from two thin layers of elastomer compound which are superposed on either side of the cords and which have a thickness of between 1 and 4 mm inclusive, respectively. The skim-coating pitch (the pitch at which the cords are laid in the elastomer compound fabric) ranges from 4 mm to 8 mm.

These composite fabrics are then used as working ply in the crown reinforcement during the method of manufacturing the tyre, the steps of which are otherwise known to a person skilled in the art.

Cord According to a Second Embodiment of the Invention

A low-modulus cord 61 according to embodiment B according to a second embodiment of the invention will now be described. Elements similar to those of the cord 60 are denoted by identical references.

Amongst the differences between the cords 60 and 61, it will be noted that in particular in particular Q>1, Q=2, 3 or 4, P=7, 8, 9 or 10, N=13, 14 or 15 and here Q=3, P=8 and N=13.

It will be noted that the Q internal threads F1 are wound in a helix within each internal strand TI at a pitch p1 such that 5 mm≤p1≤15 mm. Here, p1=12 mm. The helix angle β of each internal thread F1 of the internal layer within each internal strand TI ranges from 4° to 17°, here β=6°. The P intermediate threads F2 are wound in a helix around the Q internal threads F1 and are assembled within each internal strand TI at a pitch p2 such that 10 mm≤p2≤20 mm. Here, p2=18 mm. The helix angle δ of each intermediate thread F2 in the intermediate layer C2 within each internal strand TI ranges from 8° to 22°, here δ=10.9°. The N external threads F3 are wound in a helix around the P intermediate threads F2 and are assembled within each internal strand TI at a pitch p3 such that 10 mm≤p3≤40 mm. Here p3=25 mm. The helix angle γ of each external thread F3 in the external layer C3 within each internal strand TI ranges from 9° to 25°, here γ=12.8°.

It will also be noted that because Q>1, 36°≤3α+β+δ+γ≤162°. In this instance, in this embodiment of the cord 61 according to embodiment B and because Q>1, 36°≤3α+β+δ+γ≤128° and here 3α+β+δ+γ=51.9°.

It will be noted that Q'=1 and here, N'=5 or 6, preferably N'=6.

It will be noted that the N' external threads F2' are wound in a helix around the Q' internal threads F1' and are assembled within each external strand TE at a pitch p2' such that 5 mm≤p2'≤30 mm. Here, p2'=15 mm. The helix angle γ' of each external thread F2' in the external layer C2' within each external strand TE ranges from 5° to 26°, here γ'=8.8°.

It will be noted that because Q'>1, 28°≤2α'+β'+γ'≤86°. In this instance, in this embodiment of the cord 61 according to embodiment B, 28°≤2α'+β'+γ'≤85°. In the case of the cord 61, 2α'+β'+γ'=63.4°.

It will also be noted that, with the external layer of the cord 61 having a relatively low modulus, 81≤ME≤120. In this instance, ME=120.

It will be noted that, because Q>1 and Q'=1, 73°≤3α+β+δ+γ+2α'+β'+γ'≤212°. In the embodiment of the cord 61 according to embodiment B, 86°≤3α+β+δ+γ+2α'+β'+γ'≤168° and here 3α+β+δ+γ+2α'+β'+γ'=115.3°.

It will also be noted that ME/MI≤0.69, preferably 0.45≤ME/MI≤0.69 and here ME/MI=0.65. Also EC/EI≤0.84, preferably 0.50≤EC/EI≤0.84 and, in the embodiment of the cord 61 according to embodiment B, EC/EI≤0.80, preferably 0.50≤EC/EI≤0.80 and here EC/EI=0.68.

Cord According to a Third Embodiment of the Invention

A low-modulus cord 62 according to embodiment B according to a third embodiment of the invention will now be described. Elements similar to those of the cords already described are denoted by identical references.

Amongst the differences between the cords 60 and 62, it will be noted that 77≤MI≤135 and in the case of the cord 62 according to embodiment B comprising an internal layer having a relatively low modulus, 118≤MI≤135 and in this instance, MI=128. It will also be noted that 28 GPa≤EI≤94 GPa and, in the case of the cord 62 according to embodiment B comprising an internal layer having a relatively low modulus, 64 GPa≤MI≤94 GPa. In this instance, EI=65 GPa.

It will also be noted that Q'=1, N'=5 or 6 and here preferably N'=6. The N' external threads F2' are wound in a helix around the Q'=1 internal thread F1' and are assembled within each external strand TE at a pitch p2' such that 5 mm≤p2'≤30 mm. Here p2'=15 mm. The helix angle γ' of each external thread F2' in the external layer C2' within each external strand TE ranges from 5° to 26°, here γ'=8.8°.

It will be noted that, because Q'1=1, 28°≤2α'+β'+γ'≤86° and, in this embodiment of the cord 62 according to embodiment B, 28°≤2α'+β'+γ'≤85°. In the case of the cord 62, 2α'+β'+γ'=36.4°.

It will also be noted that, because Q=1 and Q'=1, 64°≤3α+β+δ+γ+2α'+β'+γ'≤200°, and in the embodiment of the cord 62 according to embodiment B, 74°≤3α+β+δ+γ+2α'+β'+γ'≤158° and here 3α+β+δ+γ+2α'+β'+γ'=148.5°.

It will also be noted that 1.31≤ME/MI, preferably 1.31≤ME/MI≤1.90 and, in the case of the cord 62 according to embodiment B, 1.31≤ME/MI≤1.42 and here ME/MI=1.34. Also, 1.04≤EC/EI and preferably 1.04≤EC/EI≤1.96 and in the embodiment of the cord 62 according to embodiment B, 1.14≤EC/EI, preferably 1.14≤EC/EI≤1.54 and here EC/EI=1.54.

Cord According to a Fourth Embodiment of the Invention

A very low-modulus cord 63 according to embodiment A according to a fourth embodiment of the invention will now be described. Elements similar to those of the cords already described are denoted by identical references.

Amongst the differences between the cords 60 and 63, it will be noted that the helix angle α of each internal strand TI in the internal layer CI of the cord 63 according to embodiment A ranges from 4° to 36° and in this instance α=26.7°. It will be noted that the helix angle α' of each external strand TE in the external layer CE of the cord 63 according to embodiment A ranges from 13° to 32° and in this instance α'=16°.

It will be noted that Q>1, Q=2, 3 or 4, P=7, 8, 9 or 10, N=13, 14 or 15 and here Q=3, P=8 and N=13. The Q internal threads F1 are wound in a helix within each internal strand TI at a pitch p1 such that 5 mm≤p1≤15 mm. Here, p1=5 mm. The helix angle β of each internal thread F1 of the internal layer within each internal strand TI ranges from 4° to 17°, here β=10.7°. The P intermediate threads F2 are wound in a helix around the Q internal threads F1 and are assembled within each internal strand TI at a pitch p2 such that 10 mm≤p2≤20 mm. Here, p2=10 mm. The helix angle δ of each intermediate thread F2 in the intermediate layer C2 within each internal strand TI ranges from 8° to 22°, here δ=14.5°. The N external threads F3 are wound in a helix around the P intermediate threads F2 and are assembled within each internal strand TI at a pitch p3 such that 10 mm≤p3≤40 mm. Here, p3=15 mm. The helix angle γ of each external thread F3 in the external layer C3 within each internal strand TI ranges from 9° to 25°, here γ=15.7°.

It will be noted that, in this embodiment of the cord 63 according to embodiment A, 35°≤3α+β+δ+γ≤162° and here because Q>1, 36°≤3α+β+δ+γ≤162°. In the case of the cord 63, 3α+β+δ+γ=121°.

It will also be noted that, in the case of the cord 63 according to embodiment A, 77≤MI≤193. With the cable 63 according to embodiment A having an internal layer of the cord of relatively low modulus, 77≤MI≤135. In this instance, MI=119.

It will also be noted that, in the case of the cord 63 according to embodiment A, 28 GPa≤EI≤176 GPa and, with the internal layer having a relatively low modulus, 28 GPa≤EI≤94 GPa. In this instance, EI=73 GPa.

It will be noted that, in the case of the cord 63 according to embodiment A, 34°≤2α'+β'+γ'≤96° and here because Q'>1, 42°≤2α'+β'+γ'≤96° and here, 2α'+β'+γ'=65.6°.

It will be noted that, in the case of the cord 63 according to embodiment A, 81≤ME≤174. Here, with the external layer having a relatively high modulus, 121≤ME≤174. In this instance, ME=140.

It will also be noted that, in the case of the cord 63 according to embodiment A, 100°≤3α+β+δ+γ+2α'+β'+γ'≤224° and because Q>1 and Q'=1, 121°≤3α+β+δ+γ+2α'+β'+γ'≤224° and here 3α+β+δ+γ+2α'+β'+γ'=186.6°.

It will be noted that 0.70≤ME/MI≤1.30 and here ME/MI=1.18. It will be noted that, in the case of the cord 63 according to embodiment A, 0.59≤EC/EI≤1.46 and here EC/EI=1.14.

According to the invention, the indicator MC=(J×MI+L×ME)/(J+L) is such that 95 MC≤175, preferably 95≤MC≤170. In the embodiment of the cord 63 according to embodiment A, 95≤MC≤161. In this instance, MC=133.

Also, 50 GPa≤EC≤160 GPa and in this embodiment of the cord 63 according to embodiment A, 50 GPa≤EC≤89 GPa which makes the cord 63 a very low-modulus cord. Here, EC=83 GPa.

Cord According to a Fifth Embodiment of the Invention

A very low-modulus cord 64 according to embodiment A according to a fifth embodiment of the invention will now be described. Elements similar to those of the cords already described are denoted by identical references.

Amongst the differences between the cords 63 and 64, it will be noted that it will be noted that Q=1, P=5 or 6 and N=10, 11 or 12, preferably Q=1, P=5 or 6 and N=10 or 11 and here, more preferentially Q=1, P=6 and N=11. The P intermediate threads F2 are wound in a helix around the Q=1 internal thread F1 and are assembled within each internal strand TI at a pitch p2 such that 5 mm≤p2≤20 mm. Here p2=5 mm. The helix angle δ of each intermediate thread F2 in the intermediate layer C2 within each internal strand TI ranges from 6° to 30°, here δ=19.4°. The N external threads F3 are wound in a helix around the P intermediate threads F2 and are assembled within each internal strand TI at a pitch p3 such that 10 mm≤p3≤40 mm. Here p3=10 mm. The helix angle γ of each external thread F3 in the external layer C3 within each internal strand TI ranges from 7° to 30°, here γ=18.7°.

It will be noted that, because Q=1, in the embodiment of the cord 64 according to embodiment A, 35°≤3α+β+δ+γ≤140° and here, 3α+β+δ+γ=51.9°.

It will also be noted that, with the cord 64 having an internal layer of the cord of relatively high modulus, 136≤MI≤196 and, in the embodiment of the cord 64 according to embodiment A, 136≤MI≤193. In this instance, MI=178.

It will be noted that, with the cord 64 having an internal layer of the cord of relatively high modulus, 95 GPa≤EI≤180 GPa and, in the case of the cord 64 according to embodiment A, 95 GPa≤MI≤176 GPa. In this instance, EI=146 GPa.

It will also be noted that Q'=1 and here, N'=5 or 6, preferably N'=6. The N' external threads F2' are wound in a helix around the Q'=1 internal thread F1' and are assembled within each external strand TE at a pitch p2' such that 5 mm≤p2'≤30 mm. Here p2'=5 mm. The helix angle γ' of each external thread F2' in the external layer C2' within each external strand TE ranges from 5° to 26°, here γ'=25.4°.

It will be noted that, because Q'=1, 28°≤2α'+β'+γ'≤86° and, in this embodiment of the cord 64 according to embodiment A, 34°≤2α'+β'+γ'≤86° and here 2α'+β'+γ'=64.8°.

It will be noted that, with the external layer having a relatively low modulus, 81≤ME≤120. In this instance, ME=114.

It will also be noted that, because Q=1 and Q'=1, 64°≤3α+β+δ+γ+2α'+β'+γ'≤200° and, in the embodiment of the cord 64 according to embodiment A, 100°≤3α+β+δ+γ+2α'+β'+γ'≤200° and here 3α+β+δ+γ+2α'+β'+γ'=116.7°.

It will also be noted that ME/MI≤0.69 and, in the embodiment of the cord 64 according to embodiment A, 0.59≤ME/MI≤0.69 and here ME/MI=0.64. It will also be noted that EC/EI≤0.79 and, in the embodiment of the cord 64 according to embodiment A, 0.50≤EC/EI≤0.79 and here EC/EI=0.58.

Cord According to a Sixth Embodiment of the Invention

A medium-modulus cord 65 according to embodiment C according to a sixth embodiment of the invention will now be described. Elements similar to those of the cords already described are denoted by identical references.

Amongst the differences between the cords 60 and 65, it will be noted that the helix angle α of each internal strand TI in the internal layer CI ranges, in the case of the cord 65 according to embodiment C, from 4° to 23° and in this instance α=11°. The helix angle α' of each external strand TE in the external layer CE ranges, in the case of the cord 65 according to embodiment C, from 10° to 27° and, in this instance, α'=17°.

It will also be noted that Q>1, Q=2, 3 or 4, P=7, 8, 9 or 10, N=13, 14 or 15 and here Q=3, P=8 and N=13. The Q internal threads F1 are wound in a helix within each internal strand TI at a pitch p1 such that 5 mm≤p1≤15 mm. Here, p1=8 mm. The helix angle β of each internal thread F1 of the internal layer within each internal strand TI ranges from 4° to 17°, here β=6.7°. The P intermediate threads F2 are wound in a helix around the Q internal threads F1 and are assembled within each internal strand TI at a pitch p2 such that 10 mm≤p2≤20 mm. Here, p2=15 mm. The helix angle δ of each intermediate thread F2 in the intermediate layer C2 within each internal strand TI ranges from 8° to 22°, here δ=9.8°. The N external threads F3 are wound in a helix around the P intermediate threads F2 and are assembled within each internal strand TI at a pitch p3 such that 10 mm≤p3≤40 mm. Here, p3=20 mm. The helix angle γ of each external thread F3 in the external layer C3 within each internal strand TI ranges from 9° to 25°, here γ=11.9°.

It will also be noted that, in the case of the cord 65 according to embodiment C and, because Q>1, 26°≤3α+β+δ+γ≤97° and here, 3α+β+δ+γ=61.4°.

It will be noted that, in the case of the cord 65 according to embodiment C, 143≤MI≤196 and here MI=179. Also, in the case of the cord 65 according to embodiment C, 28 GPa≤EI≤180 GPa. In the case of the cord 65 according to embodiment C, 100 GPa≤EI≤180 GPa and here EI=157 GPa.

It will also be noted that Q'=1, N'=5 or 6 and here preferably N'=6. The N' external threads F2' are wound in a helix around the Q'=1 internal thread F1' and are assembled within each external strand TE at a pitch p2' such that 5 mm≤p2'≤30 mm. Here p2'=15 mm. The helix angle γ' of each external thread F2' in the external layer C2' within each external strand TE ranges from 5° to 26°, here γ'=8.8°.

It will be noted that, in the case of the cord 65 according to embodiment C, 30°≤2α'+β'+γ'≤64° and here, because Q'=1, 30°≤2α'+β'+γ'≤62° and in this instance, 2α'+β'+γ'=44°.

It will also be noted that, in the case of the cord 65 according to embodiment C, 125≤ME≤182 and here, ME=159.

It will be noted that, in the case of the cord 65 according to embodiment C, 64°≤3α+β+δ+γ+2α'+β'+γ'≤135° and, because Q>1 and Q'=1, 73°≤3α+β+δ+γ+2α'+β'+γ'≤131°, and here, 3α+β+δ+γ+2α'+β'+γ'=105.4°.

It will be noted that, in the case of the cord 65 according to embodiment C, 0.71≤ME/MI≤1.21, and here ME/MI=0.89. Also 0.74≤EC/EI≤1.44 and here EC/EI=0.91.

According to the invention, the indicator MC=(J×MI+L×ME)/(J+L) is such that 95≤MC≤175, preferably 95≤MC≤170 and more preferentially 110≤MC≤170. In the embodiment of the cord 65 according to embodiment C, 142≤MC≤175, preferably 142≤MC≤170. In this instance, MC=164.

Also 50 GPa≤EC≤160 GPa and, in this embodiment of the cord 65 according to embodiment C, 131 GPa≤EC≤160 GPa, which makes the cord 65 a medium-modulus cord. Here EC=143 GPa.

Cord According to a Seventh Embodiment of the Invention

A medium-modulus cord 66 according to embodiment C according to a seventh embodiment of the invention will now be described. Elements similar to those of the cords already described are denoted by identical references.

Amongst the differences between the cords 65 and 66, it will be noted that Q=1, P=5 or 6 and N=10, 11 or 12, preferably Q=1, P=5 or 6 and N=10 or 11 and here, more preferentially Q=1, P=6 and N=11. The P intermediate threads F2 are wound in a helix around the Q=1 internal thread F1 and are assembled within each internal strand TI at a pitch p2 such that 5 mm≤p2≤20 mm. Here p2=15 mm. The helix angle δ of each intermediate thread F2 in the intermediate layer C2 within each internal strand TI ranges from 6° to 30°, here δ=8.8°. The N external threads F3 are wound in a helix around the P intermediate threads F2 and are assembled within each internal strand TI at a pitch p3 such that 10 mm≤p3≤40 mm. Here p3=25 mm. The helix angle γ of each external thread F3 in the external layer C3 within each internal strand TI ranges from 7° to 30°, here γ=10.3°.

It will also be noted that Q'=2, 3 or 4, preferably Q'=3 or 4. N'=7, 8, 9 or 10, preferably N'=8, 9 or 10. With Q'=3, N'=7, 8 or 9 and in this instance Q'=3, N'=8.

It will also be noted that the Q' internal threads F1' are assembled within each external strand TE at a pitch p1' such that 5 mm≤p1'≤20 mm. Here p1'=8 mm. The helix angle β' of each internal thread F1' in the internal layer C1' within each external strand TE ranges from 4° to 17°, here β'=6.7°. The N' external threads F2' are wound in a helix around the Q' internal threads F1' and are assembled within each external strand TE at a pitch p2' such that 5 mm≤p2'≤40 mm. Here p2'=15 mm. The helix angle γ' of each external thread F2' in the external layer C2' within each external strand TE ranges from 7° to 20°, here γ'=9.8°.

It will be noted that, in the case of the cord 66 according to embodiment C and, because Q'>1, 37°≤2α'+β'+γ'≤64° and in this instance, 2α'+β'+γ'=45.5°.

It will also be noted that, in the case of the cord 66 according to embodiment C and, because Q=1 and Q'>1, 68°≤3α+β+δ+γ+2α'+β'+γ'≤127° and here 3α+β+δ+γ+2α'+β'+γ'=101.5°.

It will be noted that each cord described above is metal and of the multi-strand type with two cylindrical layers. Thus, it will be understood that there are two layers, not more, not less, of strands of which the cord is made. The layers of strands are adjacent and concentric. It will also be noted that the cord is devoid of polymer compound and of elastomer compound when it is not integrated into the tyre.

Tables 1 and 2 below summarize the features of the cords 60 to 66 described hereinabove and those of examples 2-1, 2-2 and 24 of WO2008026271 which are identified by the letter T2-1, T2-2 and T2-4, respectively, in Table 1.

These Tables 1 and 2 list the measured modulus values EC of the cords. On a curve of force-elongation measured in accordance with standard ASTM D2969-04, the structural elongations As, elastic elongations Ae, and plastic elongations Ap have been identified. The structural elongation As is measured between the origin and the intersection of the tangent to the elastic part with the abscissa axis. The elastic elongation Ae is measured between the intersection of the tangent to the elastic part with the abscissa axis and the intersection of the tangent to the elastic part with the ordinate value corresponding to the elongation at break. The plastic elongation Ap is measured between the intersection of the tangent to the elastic part with the ordinate value corresponding to the elongation at break, and the elongation at break.

Of course, the invention is not restricted to the exemplary embodiments described above.

For reasons of industrial feasibility, of cost and of overall performance, it is preferable to implement the invention with linear threads, that is to say straight threads. In other words, the threads used are not pre-formed prior to being assembled.

It will also be possible to combine the features of the various embodiments described or envisaged above, with the proviso that these features are compatible with one another.

TABLE 1

| Cord | | T2-1 | T2-2 | T2-4 | 60 | 61 |
|---|---|---|---|---|---|---|
| TI | Q/P/N | 3/9/15 | 3/—/9 | 3/—/9 | 1/6/11 | 3/8/13 |
| | D1/D2/D3 | 0.175/0.175/0.175 | 0.255/0.255 | 0.175/0.175 | 0.26/0.26/0.26 | 0.35/0.35/0.35 |
| | P1/p1/p2/p3 (mm) | 50/5/10/15 | 55/8/16 | 45/5.5/12 | 20/inf/7.7/15.4 | 60/12/18/25 |
| | α/β/δ/γ | 4.5/7.3/9.8/10.7 | 4/6.6/—/9 | 3.4/6.6/82 | 13.4/0/12.2/12.1 | 7.4/6/10.9/12.8 |
| | 3α + β + δ + γ | 41.3 | / | / | 64.5 | 51.9 |
| | MI | 191 | 194 | 191 | 173 | 186 |
| | EI (GPa) | >170 | >170 | >170 | 147 | 164 |
| TE | Q'/N' | 3/9/15 | 3/9 | 3/9/15 | 3/8 | 1/6 |
| | D1'/D2' | 0.175/0.175/0.175 | 0.255/0.255 | 0.255/0.255/0.255 | 0.35/0.35 | 0.39/0.35 |
| | PE/p1'/p2' (mm) | 65/5/10/15 | 60/8/16 | 55/6/12/18 | 40/7.7/15.4 | 35/inf/15 |
| | α'/β'/γ' | 9.3/7.3/9.8/10.7 | 9.9/6.6/9 | 10.3/8.8/11.9/12.9 | 18.6/9.4/12.7 | 27.3/0/8.8 |
| | 2α' + β' + γ' | / | 35.4 | / | 59.3 | 63.4 |
| | ME | 178 | 180 | 171 | 148 | 120 |
| J/L | | 3/9 | 3/9 | 3/6 | 3/8 | 3/8 |
| MC | | 182 | 184 | 178 | 155 | 138 |
| ME/MI | | 0.93 | 0.94 | 0.89 | 0.85 | 0.65 |
| 3α + β + δ + γ + 2α' + β' + γ' | | / | / | / | 123.8 | 115.3 |
| EC (GPa) | | >160 | >160 | >160 | 111 | 112 |
| EC/EI | | / | / | / | 0.75 | 0.68 |

TABLE 2

| Cord | | 62 | 63 | 64 | 65 | 66 |
|---|---|---|---|---|---|---|
| TI | Q/P/N | 1/6/11 | 3/8/13 | 1/6/11 | 3/8/13 | 1/6/11 |
| | D1/D2/D3 | 0.39/0.35/0.35 | 0.26/0.26/0.26 | 0.30/0.26/0.26 | 0.26/0.26/0.26 | 0.39/0.35/0.35 |
| | P1/p1/p2/p3 (mm) | 15/inf/5/10 | 15/5/10/15 | 60/inf/5/10 | 30/8/15/20 | 30/inf/15/25 |
| | α/β/δ/γ | 20.7/0/25.4/24.6 | 26.7/10.7/14.5/15.7 | 4.6/0/19.4/18.7 | 11/6.7/9.8/11.9 | 12.3/0/8.8/10.3 |
| | 3α + β + δ + γ | 112.10 | 121 | 51.90 | 61.40 | 56 |
| | MI | 128 | 119 | 178 | 179 | 178 |
| | EI (GPa) | 65 | 73 | 146 | 157 | 157 |
| TE | Q'/N' | 1/6 | 3/8 | 1/6 | 1/6 | 3/8 |
| | D1'/D2' | 0.39/0.35 | 0.35/0.35 | 0.39/0.35 | 0.39/0.35 | 0.26/0.26 |
| | PE/p1'/p2' (mm) | 50/inf/15 | 60/5/10 | 35/inf/5 | 45/inf/15 | 60/8/15 |
| | α'/β'/γ' | 13.8/0/8.8 | 16/14.4/19.2 | 19.7/0/25.4 | 17.6/0/8.8 | 14.5/6.7/9.8 |
| | 2α' + β' + γ' | 36.4 | 65.6 | 64.8 | 44 | 45.5 |
| | ME | 171 | 140 | 114 | 159 | 167 |
| J/L | | 2/8 | 4/9 | 3/8 | 3/8 | 3/8 |
| MC | | 162 | 133 | 131 | 164 | 170 |
| ME/MI | | 1.34 | 1.18 | 0.64 | 0.89 | 0.94 |
| 3α + β + δ + γ + 2α' + β' + γ' | | 148.5 | 186.6 | 116.7 | 105.4 | 101.5 |
| EC (GPa) | | 100 | 83 | 85 | 143 | 149 |
| EC/EI | | 1.54 | 1.14 | 0.58 | 0.91 | 0.95 |

The invention claimed is:

1. A two-layer multi-strand cord comprising:
an internal layer of the cord made up of J>1 internal strands wound in a helix, each internal strand having three layers and comprising an internal layer made up of Q≥1 internal threads of diameter D1, an intermediate layer made up of P>1 intermediate threads of diameter D2 wound around the internal layer, and an external layer made up of N>1 external threads of diameter D3 wound around the intermediate layer; and
an external layer of the cord made up of L>1 external strands wound around the internal layer of the cord, each external strand having two layers and comprising an internal layer made up of Q'≥1 internal threads of diameter D1', and an external layer made up of N'>1 external threads of diameter D2' wound around the intermediate layer,
wherein the cord satisfies the following relationship:

$$95 \leq MC \leq 175$$

where $MC=(J \times MI + L \times ME)/(J+L)$, where $MI=200 \times \cos^4(\alpha) \times [Q \times (D1/2)^2 \times \cos^4(\beta) + P \times (D2/2)^2 \times \cos^4(\delta) + N \times (D3/2)^2 \times \cos^4(\gamma)]/[Q \times (D1/2)^2 + P \times (D2/2)^2 + N \times (D3/2)^2]$, where D1, D2 and D3 are expressed in mm, α is the helix angle of each internal strand in the internal layer of the cord, β is the helix angle of each internal thread in the internal layer within each internal strand, δ is the helix angle of each intermediate thread in the intermediate layer within each internal strand, and γ is the helix angle of each external thread in the external layer within each internal strand, where $ME=200 \times \cos^4(\alpha') \times [Q' \times (D1'/2)^2 \times \cos^4(\beta') + N' \times (D2'/2)^2 \times \cos^4(\gamma')]/[Q' \times (D1'/2)^2 + N' \times (D2'/2)^2]$,
and where D1' and D2' are expressed in mm, α' is the helix angle of each external strand in the external layer of the cord, β' is the helix angle of each internal thread in the internal layer within each external strand, and γ' is the helix angle of each external thread in the external layer within each external strand.

2. The two-layer multi-strand cord according to claim 1, wherein 95≤MC≤170.

3. The two-layer multi-strand cord according to claim 1, wherein 77≤MI≤196.

4. The two-layer multi-strand cord according to claim 1, wherein 81≤ME≤182.

5. The two-layer multi-strand cord according to claim 1, wherein $0.70 \leq ME/MI \leq 1.30$.

6. The two-layer multi-strand cord according to claim 1, wherein the helix angle $\alpha$ of each internal strand in the internal layer of the cord ranges from 4° to 36°.

7. The two-layer multi-strand cord according to claim 1, wherein the helix angle $\alpha'$ of each external strand in the external layer of the cord ranges from 10° to 32°.

8. The two-layer multi-strand cord according to claim 1, wherein $26° \leq 3\alpha+\beta+\delta+\gamma \leq 162°$.

9. The two-layer multi-strand cord according to claim 1, wherein $28° \leq 2\alpha'+\beta'+\gamma' \leq 96°$.

10. The two-layer multi-strand cord according to claim 1, wherein $64° \leq 3\alpha+\beta+\delta+\gamma+2\alpha'+\beta'+\gamma' \leq 224°$.

11. The two-layer multi-strand cord according to claim 1, wherein J=2, 3 or 4.

12. The two-layer multi-strand cord according to claim 1, wherein L=7, 8, 9 or 10.

13. The two-layer multi-strand cord according to claim 1, wherein the external layer of the cord is desaturated.

14. The two-layer multi-strand cord according to claim 1, wherein the cord has a modulus EC such that 50 GPa$\leq$EC$\leq$160 GPa.

15. A tire comprising the two-layer multi-strand cord according to claim 1.

* * * * *